US012633835B2

(12) United States Patent
Ishii

(10) Patent No.: US 12,633,835 B2
(45) Date of Patent: May 19, 2026

(54) POWER CONVERTER

(71) Applicant: OMRON Corporation, Kyoto (JP)

(72) Inventor: Takanori Ishii, Kyoto (JP)

(73) Assignee: OMRON Corporation, Kyoto (JP)

( * ) Notice: Subject to any disclaimer, the term of this patent is extended or adjusted under 35 U.S.C. 154(b) by 213 days.

(21) Appl. No.: 18/704,359

(22) PCT Filed: Oct. 28, 2022

(86) PCT No.: PCT/JP2022/040412
§ 371 (c)(1),
(2) Date: Apr. 24, 2024

(87) PCT Pub. No.: WO2023/095550
PCT Pub. Date: Jun. 1, 2023

(65) Prior Publication Data
US 2025/0125732 A1 Apr. 17, 2025

(30) Foreign Application Priority Data

Nov. 29, 2021 (JP) ................................. 2021-193572

(51) Int. Cl.
*H02M 3/335* (2006.01)
*H02M 1/00* (2006.01)
(52) U.S. Cl.
CPC ....... *H02M 3/3353* (2013.01); *H02M 1/0043* (2021.05)
(58) Field of Classification Search
CPC .... H02M 3/315; H02M 3/3155; H02M 3/325; H02M 3/33; H02M 3/335;
(Continued)

(56) References Cited

U.S. PATENT DOCUMENTS

2013/0343093 A1* 12/2013 Ando ................ H02M 3/33584
363/17
2018/0076713 A1 3/2018 Kokusho et al.
(Continued)

FOREIGN PATENT DOCUMENTS

CN 108075665 A 5/2018
JP 2010093938 A 4/2010
(Continued)

OTHER PUBLICATIONS

Extended European Search Report issued in European Appln. No. 22898335.9 mailed Aug. 25, 2025.
(Continued)

*Primary Examiner* — Nguyen Tran
(74) *Attorney, Agent, or Firm* — ROSSI, KIMMS & McDOWELL LLP

(57) ABSTRACT

When a step-up operation is performed, a control device of a power converter outputs a first reference control signal for turning ON/OFF a first switching element to the first switching element and a third switching element of a first full bridge circuit, outputs a first reference inverted signal with an inverted phase with respect to the first reference control signal to a second switching element and a fourth switching element, extends a period in which at least the second switching element and the fourth switching element of a second switching leg are simultaneously OFF such that the period is longer than a period in which the first switching element and the third switching element of a first switching leg are simultaneously OFF.

5 Claims, 20 Drawing Sheets

(58) Field of Classification Search

CPC ......... H02M 3/33507; H02M 3/33515; H02M 3/33523; H02M 3/3353; H02M 3/33546; H02M 3/33553; H02M 3/33561; H02M 3/33569; H02M 3/33571; H02M 3/33573; H02M 3/33576; H02M 3/33574; H02M 3/33592; H02M 1/0043; H02M 1/0035; H02M 1/0003

See application file for complete search history.

(56)                References Cited

U.S. PATENT DOCUMENTS

| | | | |
|---|---|---|---|
| 2022/0360182 A1 | 11/2022 | Hirota et al. | |
| 2023/0131143 A1* | 4/2023 | Morrison .......... | H02M 3/33573 |
| | | | 363/68 |

FOREIGN PATENT DOCUMENTS

| | | | |
|---|---|---|---|
| JP | 2013055858 A | 3/2013 | |
| JP | 2018046643 A | 3/2018 | |
| JP | 2019118234 A | 7/2019 | |
| JP | 2021093849 A | 6/2021 | |
| WO | 2021053911 A1 | 3/2021 | |

OTHER PUBLICATIONS

International Search Report issued in Intl. Appln. No. PCT/JP2022/040412, mailed Jan. 10, 2023. English translation provided.
Written Opinion issued in Intl. Appln. No. PCT/JP2022/040412, mailed Jan. 10, 2023. English translation provided.

* cited by examiner

CIRCUIT MODEL WITH SIMPLIFIED CHANGE
IN EXCITATION CURRENT

IDEAL (NO DIRECT CURRENT COMPONENT)

WHEN THERE IS A SHIFT IN SWITCHING OR THE LIKE
(THERE IS A DC CURRENT COMPONENT)

POWER CONVERTER

TECHNICAL FIELD

The present invention relates to a DAB power converter capable of a step-up/step-down operation.

BACKGROUND ART

As a known power converter, there has been proposed a dual active bridge (DAB) type insulated bidirectional DC/DC converter that includes full bridge circuits on both the primary side and the secondary side of a transformer and is capable of a step-up/step-down operation. One issue with this DAB type insulated bidirectional DC/DC converter is suppressing magnetic bias caused by a direct current component generated in the transformer during a step-up operation and a step-down operation (e.g., refer to Patent Documents 1 and 2).

When magnetic bias occurs in the transformer due to the direct current component, the transformer core is magnetically saturated by the magnetic bias component, which may cause an overcurrent. To suppress such magnetic bias, a capacitor for preventing magnetic bias may be added, or a resistor may be inserted in series. However, this leads to an increase in loss due to the addition of these components, an increase in size of the insulated bidirectional DC/DC converter, and an increase in manufacturing costs.

CITATION LIST

Patent Literature

Patent Document 1: JP 2010-93938 A
Patent Document 2: JP 2019-118234 A

SUMMARY OF INVENTION

Technical Problem

The present invention has been made in view of the above-described circumstances, and an object of the present invention is to provide a technique with which magnetic bias in a transformer can be suppressed without using an additional component for preventing magnetic bias and that can achieve high efficiency and size-decrease of an insulated bidirectional DC/DC converter.

Solution to Problem

According to an aspect of the technique disclosed for solving the problem described above, a power converter includes:

a DC/DC converter including a first full bridge circuit including a first switching leg and a second switching leg connected in parallel with a first input/output terminal pair, a second full bridge circuit including a third switching leg and a fourth switching leg connected in parallel with a second input/output terminal pair, and a transformer including a first winding connected to the first full bridge circuit and a second winding connected to the second full bridge circuit; and a control unit configured to control the DC/DC converter, in which the first switching leg includes a first switching element and a third switching element, a source terminal of the first switching element and a drain terminal of the third switching element being connected in series at a first connection point, and a drain terminal of the first switching element and a source terminal of the third switching element being connected to the first input/output terminal pair, the second switching leg includes a second switching element and a fourth switching element, a source terminal of the second switching element and a drain terminal of the fourth switching element being connected in series at a second connection point, and a drain terminal of the second switching element and a source terminal of the fourth switching element being connected to the first input/output terminal pair, the third switching leg includes a fifth switching element and a seventh switching element, a source terminal of the fifth switching element and a drain terminal of the seventh switching element being connected in series at a third connection point, and a drain terminal of the fifth switching element and a source terminal of the seventh switching element being connected to the second input/output terminal pair, the fourth switching leg includes a sixth switching element and an eighth switching element, a source terminal of the sixth switching element and a drain terminal of the eighth switching element being connected in series at a fourth connection point, and a drain terminal of the sixth switching element and a source terminal of the eighth switching element being connected to the second input/output terminal pair, the first winding of the transformer is connected to the first connection point of the first switching leg and the second connection point of the second switching leg, and the second winding of the transformer is connected to the third connection point of the third switching leg and the fourth connection point of the fourth switching leg, and when a step-up operation is performed, the control unit outputs a first reference control signal for turning ON/OFF the first switching element to the first switching element and the third switching element of the first full bridge circuit, outputs a first reference inverted signal with an inverted phase with respect to the first reference control signal to the second switching element and the fourth switching element, and extends a period in which at least the second switching element and the fourth switching element of the second switching leg are simultaneously OFF such that the period is longer than the period in which the first switching element and the third switching element of the first switching leg are simultaneously OFF.

According to a power converter with this configuration, when magnetic bias occurs in the transformer TR, the magnetic bias can be suppressed by operating the dead time of each switching element related to step-up switching on a leg-by-leg basis. For example, the power converter controls the dead time to increase the dead time only in the period effective for current discontinuation (a current value zero section) of the transformer current flowing through transformer TR, and the voltage applied to the excitation inductance Lm to reduce the direct current component included in the excitation current can be controlled while suppressing a relative reduction in loss. Accordingly, the section in which the current value is zero when the transformer current flowing through the transformer TR transitions from the positive side to the negative side and from the negative side to the positive side can be ensured. Thus, a technique capable of suppressing magnetic bias in a transformer without using an additional component for preventing magnetic bias and achieving high efficiency and size-decrease of an insulated bidirectional DC/DC converter can be provided.

Also, in the present invention, the control unit may vary a period in which the fifth switching element and the seventh switching element of the third switching leg are simultaneously OFF according to a first phase shift amount, where the first phase shift amount is a delay amount from a fall of the second switching element from ON to OFF to a fall of the seventh switching element of the third switching leg from ON to OFF. Accordingly, it is possible to suppress the output fluctuation when the operation is switched from the step-up mode to the step-down mode.

Also, in the present invention, the control unit may vary a period in which the sixth switching element and the eighth switching element of the fourth switching leg are simultaneously OFF according to a second phase shift amount, where the second phase shift amount is a delay amount from a fall of the fourth switching element from ON to OFF to a fall of the eighth switching element of the fourth switching leg from ON to OFF. Accordingly, it is possible to suppress the output fluctuation when the operation is switched from the step-up mode.

Also, in the present invention, when a step-down operation is performed, the control unit may output a second reference control signal to the fourth switching element of the first full bridge circuit and output a second reference inverted signal with an inverted phase with respect to the second reference control signal to the second switching element, output a third reference control signal with a third phase shift amount delayed more than the second reference control signal to the third switching element of the first full bridge circuit and output a third reference inverted signal with an inverted phase with respect to the third reference control signal to the first switching element, and change a period in which at least the first switching element and the third switching element of the first switching leg are simultaneously OFF such that the period is shorter than a period in which the second switching element and the fourth switching element of the second switching leg are simultaneously OFF, where the second reference control signal is a control signal for turning ON/OFF the fourth switching element of the first full bridge circuit, and the third phase shift amount is a delay amount from a fall of the fourth switching element from ON to OFF to a fall of the third switching element of the first switching leg from ON to OFF.

According to a power converter with this configuration, when magnetic bias occurs in the transformer TR, the magnetic bias can be suppressed by operating the dead time of each switching element related to step-down switching on a leg-by-leg basis. For example, the power converter controls the dead time to increase the dead time only in the period effective for current discontinuation (the current value zero section) of the transformer current flowing through the transformer TR, and the voltage applied to the excitation inductance Lm to reduce the direct current component included in the excitation current can be controlled while suppressing a relative reduction in loss. Even in the case of step-down switching, a section in which the current value is zero when the transformer current flowing through the transformer TR transitions from the positive side to the negative side and from the negative side to the positive side can be ensured. Thus, a technique capable of suppressing magnetic bias in a transformer without using an additional component for preventing magnetic bias and achieving high efficiency and size-decrease of an insulated bidirectional DC/DC converter can be provided.

Also, in the present invention, the control unit may vary a period in which the fifth switching element and the seventh switching element of the third switching leg are simultaneously OFF according to the third phase shift amount. Also, the control unit may vary a period in which the sixth switching element and the eighth switching element of the fourth switching leg are simultaneously OFF according to the third phase shift amount. Accordingly, it is possible to suppress the output fluctuation when the operation is switched from the step-down mode to the step-up mode.

Advantageous Effects of Invention

According to the present invention, a technique with which magnetic bias can be suppressed in a transformer without using an additional component for preventing magnetic bias and that can achieve high efficiency and size-decrease of an insulated bidirectional DC/DC converter can be provided.

DESCRIPTION OF EMBODIMENTS

Application Example

Hereinafter, an application example of the present invention will be described with reference to the drawings.

Figure 1:
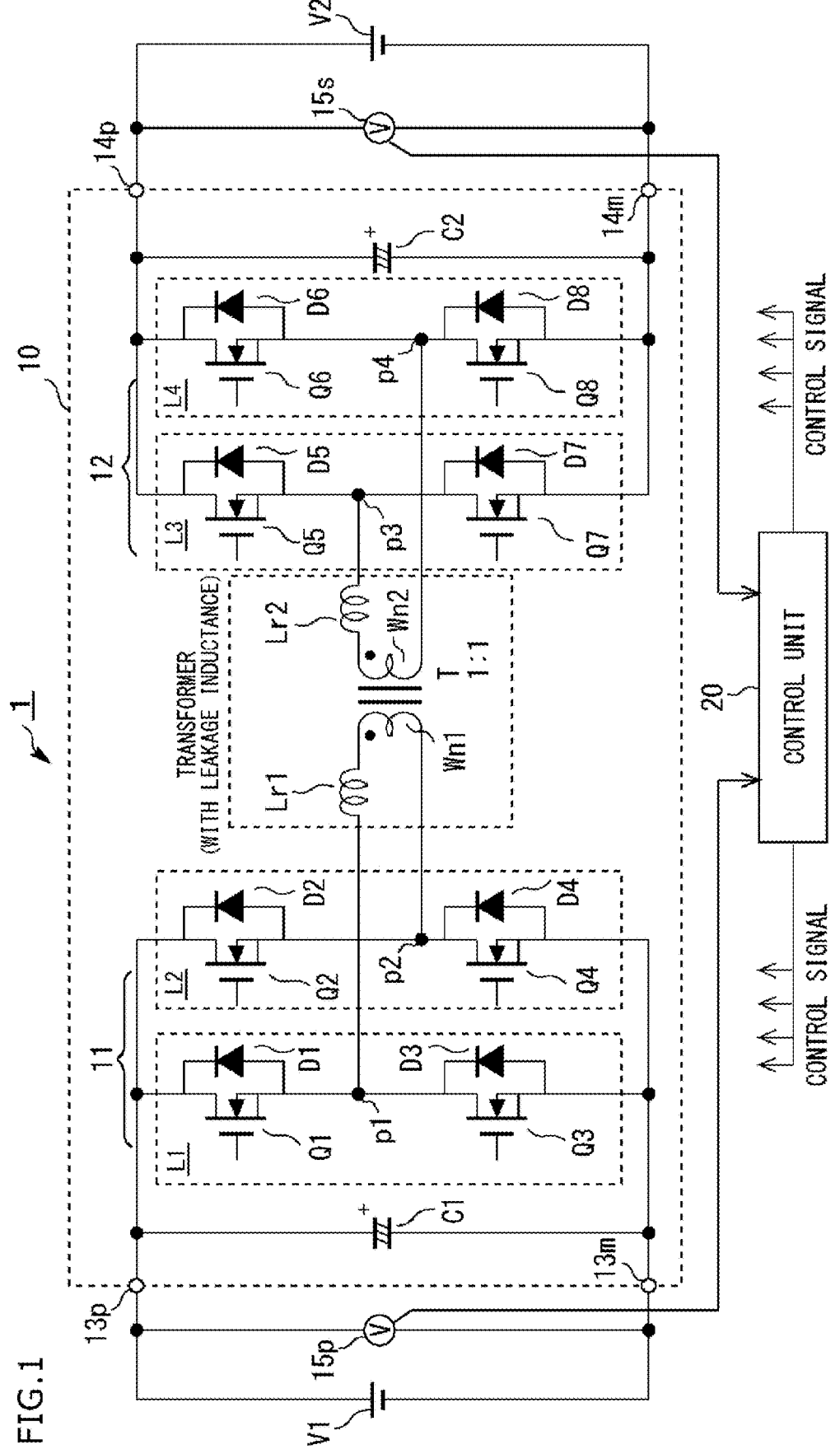
FIG. 1 is a diagram illustrating a schematic configuration of a power converter 1 according to an embodiment of the present invention.

FIG. 1 is a diagram illustrating a schematic configuration of a power converter 1 according to an application example of the present invention. The power converter 1 according to this application example includes a dual active bridge (DAB) DC/DC converter 10, and is a device capable of bidirectional power conversion via a transformer TR. The power converter 1 includes a control unit 20 that controls the DC/DC converter 10 (ON/OFF of each switching element in the DC/DC converter 10) by changing the level of a control signal sent to each switching element in the DC/DC converter 10.

The control unit 20 is configured (programmed) to determine which of the following four types of converters is to be operated as the DC/DC converter 10 on the basis of input data (current value and voltage value) and to control the DC/DC converter 10 to operate as the determined converter.

Step-up converter in which a first input/output terminal pair 13 side is the primary side Step-down converter in which the first input/output terminal pair 13 side is the primary side Step-up converter in which a second input/output terminal pair 14 side is the primary side Step-down converter in which the second input/output terminal pair 14 side is the primary side The control unit 20 is also configured (programmed) to immediately change the type of control for the DC/DC converter 10 (e.g., change from control to operate the DC/DC converter 10 as the step-up converter in which the first input/output terminal pair 13 side is the primary side to control to operate the DC/DC converter 10 as the step-down converter in which the second input/output terminal pair 14 side is the primary side).

As illustrated in FIG. 2, FIG. 3A, FIG. 3B, FIG. 3C, FIG. 3D, FIG. 4A, FIG. 4B and FIG. 4C, in the switching elements (Q1 to Q8) constituting the DC/DC converter 10, there is an individual difference between devices regarding switching at the time of step-up/step-down conversion. Thus, at the time of power conversion (step-up conversion, step-down conversion), direct current components caused by individual differences between the switching elements (Q1 to Q8) constituting the DC/DC converter 10 may occur in the transformer TR.

In the power converter 1 according to the present embodiment, when magnetic bias occurs in the transformer TR, the magnetic bias is suppressed by operating the dead time of each switching element related to step-up switching and step-down switching on a leg-by-leg basis. To be more specific, as illustrated in FIG. 16A, FIG. 16B, FIG. 16C, FIG. 16D, FIG. 16E and FIG. 17A, FIG. 17B, FIG. 17C, FIG. 17D, FIG. 17E, the duration of the dead time period is increased or decreased on a leg-by-leg basis so that direct current components included in the excitation current flowing through an excitation inductance Lm of the transformer TR decrease, whereby the voltage applied to the excitation inductance Lm is controlled. In this manner, a technique with which magnetic bias in a transformer can be suppressed without using an additional component for preventing magnetic bias and that can achieve high efficiency and size-decrease of an insulated bidirectional DC/DC converter can be provided.

First Embodiment

Hereinafter, specific embodiments of the present invention will be described in more detail with reference to the drawings. Note that the configurations of the embodiments described below are merely examples, and the disclosed techniques are not limited to the configurations of the embodiments.

<Power Converter Configuration>

FIG. 1 is a diagram illustrating a schematic configuration of the power converter 1 according to the first embodiment of the present invention. The power converter 1 according to the present embodiment includes the dual active bridge (DAB) DC/DC converter 10, and is a device capable of bidirectional power conversion via a transformer TR. As illustrated, the power converter includes the DC/DC converter 10, the control unit 20, the first input/output terminal pair 13 (13p and 13m), and the second input/output terminal pair 14 (14p and 14m). In the first input/output terminal pair 13 and the second input/output terminal pair 14, the input/output terminals 13p and 14p are high-potential-side input/output terminals, and the input/output terminals 13m and 14m are low-potential-side input/output terminals. A capacitor C1 for smoothing the input/output voltage is connected between the input/output terminals 13m and 13p. Similarly, a capacitor C2 for smoothing the input/output voltage is connected between the input/output terminals 14m and 14p. Electrolytic capacitors are exemplified as the capacitors C1 and C2.

The DC/DC converter 10 is an insulated bidirectional DC/DC converter including the transformer TR, two reactors Lr1 and Lr2, and two full bridge circuits 11 and 12 as main components. Hereinafter, the full bridge circuit 11 on the left side and the full bridge circuit 12 on the right side in FIG. 1 are also referred to as a first full bridge circuit 11 and a second full bridge circuit 12, respectively. Similarly, the reactor Lr1 on the left side and the reactor Lr2 on the right side in FIG. 1 are also referred to as a first reactor Lr1 and a second reactor Lr2, respectively. In addition, a winding Wn1 connected to the full bridge circuit 11 and a winding Wn2 connected to the full bridge circuit 12 in the transformer TR are also referred to as a first winding Wn1 and a second winding Wn2, respectively. The first reactor Lr1 and the second reactor Lr2 may use the leakage inductance of the first winding Wn1 connected to the full bridge circuit 11 of the transformer TR and the leakage inductance of the second winding Wn2 connected to the full bridge circuit 12 of the transformer TR, respectively. Note that the transformer TR of the DC/DC converter 10 may not have a turn ratio of 1:1. However, hereinafter, the configuration and operation of the power converter 1 will be described on the assumption that the turn ratio of the transformer TR is 1:1.

The first full bridge circuit 11 of the DC/DC converter 10 includes a first leg L1 with a first switching element Q1 and a third switching element Q3 connected in series, and a second leg L2 with a second switching element Q2 and a fourth switching element Q4 connected in series. As illustrated, an n-th diode Dn (n=1 to 4) is connected in parallel between the drain terminal and the source terminal of an n-th switching element Qn (n=1 to 4) of each leg. Further, each leg is connected to the first input/output terminal pair 13. The drain terminal of the first switching element Q1 and the drain terminal of the second switching element Q2 are connected to the input/output terminal 13p, and the source terminal of the third switching element Q3 and the source terminal of the fourth switching element Q4 are connected to the input/output terminal 13m. In the first leg L1, a connection point p1 at which the source terminal of the first switching element Q1 and the drain terminal of the third switching element Q3 are connected is connected to a first end of the first winding Wn1 of the transformer TR via the first reactor Lr1. In the second leg L2, a connection point p2 at which the source terminal of the second switching element Q2 and the drain terminal of the fourth switching element Q4 are connected is connected to a second end of the first winding Wn1 of the transformer TR.

The second full bridge circuit 12 of the DC/DC converter 10 includes a third leg L3 with a fifth switching element Q5 and a seventh switching element Q7 connected in series and a fourth leg L4 with a sixth switching element Q6 and an eighth switching element Q8 connected in series. As illustrated, the n-th diode Dn (n=5 to 8) is connected in parallel between the drain terminal and the source terminal of the n-th switching element Qn (n=5 to 8) of each leg. The third leg L3 and the fourth leg L4 are both connected to the second input/output terminal pair 14. The drain terminal of the fifth switching element Q5 and the drain terminal of the sixth switching element Q6 are connected to the input/output terminal 14p, and the source terminal of the seventh switching element Q7 and the source terminal of the eighth switching element Q8 are connected to the input/output terminal 14m. In the third leg L3, a connection point p3 at which the source terminal of the fifth switching element Q5 and the drain terminal of the seventh switching element Q7 are connected is connected to a first end of the second winding Wn2 of the transformer TR via the second reactor Lr2. In the fourth leg L4, a connection point p4 at which the source terminal of the sixth switching element Q6 and the drain terminal of the eighth switching element Q8 are connected is connected to a second end of the second winding Wn2 of the transformer TR. Hereinafter, the "n-th switching element Qn (n=1 to 8)" may be simply referred to as the "switching element Qn (n=1 to 8)", and the "n-th diode Dn (n=1 to 8)" may be simply referred to as the "diode Dn (n=1 to 8)". The diode Dn (n=1 to 8) may be an internal diode of the switching element Qn (n=1 to 8) or may be an externally attached diode.

As the semiconducting material of the switching elements Q1 to Q8, gallium nitride (GaN), silicon (Si), silicon carbide (SiC), or the like can be used, but no limitation is intended. As the semiconductor switching element, a metal oxide semiconductor field effect transistor (MOSFET), an insulated gate bipolar transistor (IGBT), or the like can be used. The diodes D1 to D8 are connected in anti-parallel to the semiconductor switching elements used as the switching elements Q1 to Q8.

The first input/output terminal pair 13 and the second input/output terminal pair 14 of the DC/DC converter 10 are provided with voltage sensors 15p and 15s for measuring the magnitude of input/output voltages. Note that the DC/DC converter 10 may be provided with various sensors for measuring the magnitude of input/output currents.

The control unit 20 is a unit that controls the DC/DC converter 10 (ON/OFF of each switching element in the DC/DC converter 10) by changing the level of a control signal sent to each switching element in the DC/DC converter 10. Hereinafter, the control signal for the n-th switching element Qn (n=1 to 8) is also referred to as a control signal Gn. The control signal Gn generated by the control unit 20 is input to the gate terminal of the corresponding n-th switching element Qn (n=1 to 8). The control unit 20 includes a processor such as a microcontroller, a gate driver, and the like, and outputs of the various above-described sensors (voltage sensors 15p and 15s, etc.) are input to the control unit 20.

In addition, the control unit 20 is configured (programmed) to determine which of the following four types of converters is to be operated as the DC/DC converter 10 on the basis of input data (current value and voltage value) and to control the DC/DC converter 10 to operate as the determined converter.

Step-up converter in which the first input/output terminal pair 13 side is the primary side Step-down converter in which the first input/output terminal pair 13 side is the primary side Step-up converter in which the second input/output terminal pair 14 side is the primary side Step-down converter in which the second input/output terminal pair 14 side is the primary side The control unit 20 is also configured (programmed) to immediately change the type of control for the DC/DC converter 10 (e.g., change from control to operate the DC/DC converter 10 as the step-up converter in which the first input/output terminal pair 13 side is the primary side to control to operate the DC/DC converter 10 as the step-down converter in which the second input/output terminal pair 14 side is the primary side).

(Magnetic Bias in Transformer)

Figure 2:
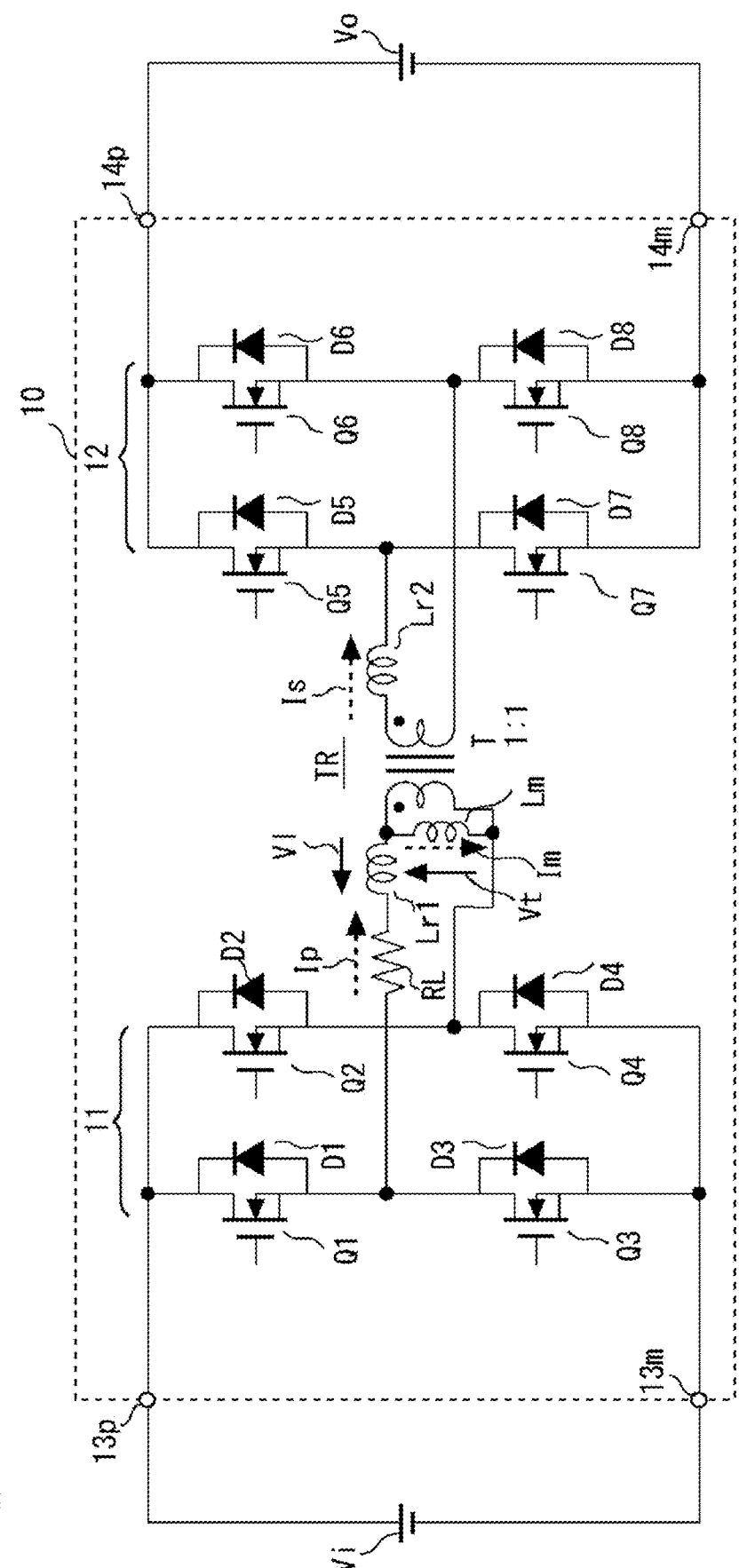
FIG. 2 is a schematic block diagram of a DC/DC converter for describing magnetic bias on which the present invention is premised.

First, magnetic bias occurring in the transformer TR of the DC/DC converter 10 will be described with reference to FIG. 2, FIG. 3A, FIG. 3B, FIG. 3C, FIG. 3D, FIG. 4A, FIG. 4B and FIG. 4C. FIG. 2 is a schematic block diagram of the DC/DC converter 10 for describing magnetic bias. In FIG. 2, "RL" represents the impedance of the transformer TR during the switching operation, and "Lm" represents the excitation inductance of the transformer TR during the switching operation. Further, "Ip", "Im", and "Is" indicated by broken line arrows represent a current flowing through the impedance RL, an excitation current flowing through the excitation inductance Lm, and a current flowing through the second reactor Lr2 (or leakage inductance on the secondary side), respectively. Furthermore, "Vt" and "Vl" indicated by solid line arrows represent a voltage applied to the first reactor Lr1 (or the leakage inductance on the primary side) and a voltage applied to the excitation inductance Lm, respectively. The arrow directions of the broken line arrows and the solid line arrows indicate the direction in which the current flows and the direction in which the voltage is applied, respectively. In the DC/DC converter 10 illustrated in FIG. 2, an input voltage Vi applied to the first input/output terminal pair 13 is stepped up by switching operations of the switching elements Q1 to Q4 of the first full bridge circuit 11 and the switching elements Q5 to Q8 of the second full bridge circuit 12, and an output voltage Vo is output to the second input/output terminal pair 14.

Figures 3A, 3B:
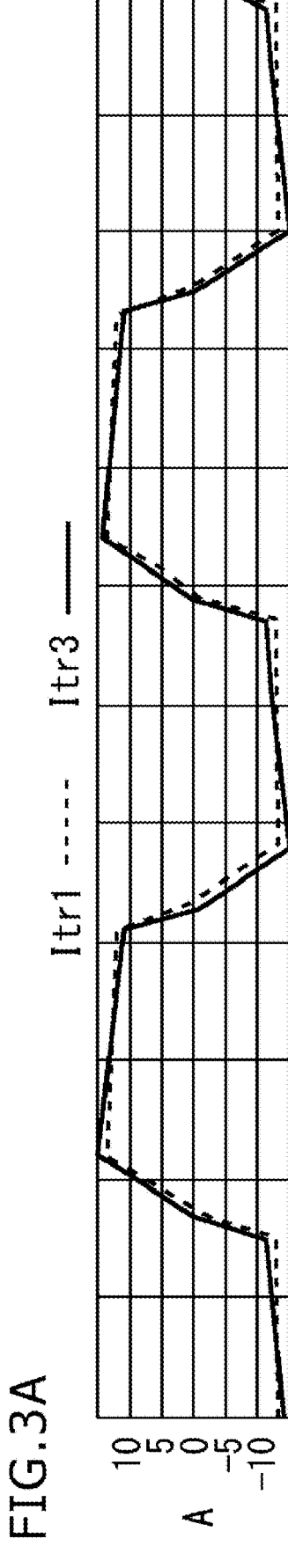
FIG. 3A, FIG. 3B, FIG. 3C and FIG. 3D are time charts showing the transition of control during a step-up converter operation of the DC/DC converter on which the present invention is premised.

FIG. 3A, FIG. 3B, FIG. 3C and FIG. 3D are time charts for describing the transition of control during step-up converter operation of the DC/DC converter 10. FIG. 3A is a graph showing the transition of the current flowing through the transformer TR, where the vertical axis represents the magnitude of the current (A) and the horizontal axis represents the passage of time. The broken line indicated in the graph of FIG. 3A represents the transition of a current (Itr1) flowing through the first reactor Lr1 during the step-up converter operation, and the solid line indicated in the graph represents the transition of a current (Itr3) flowing through the second reactor Lr2.

Figure 3C:
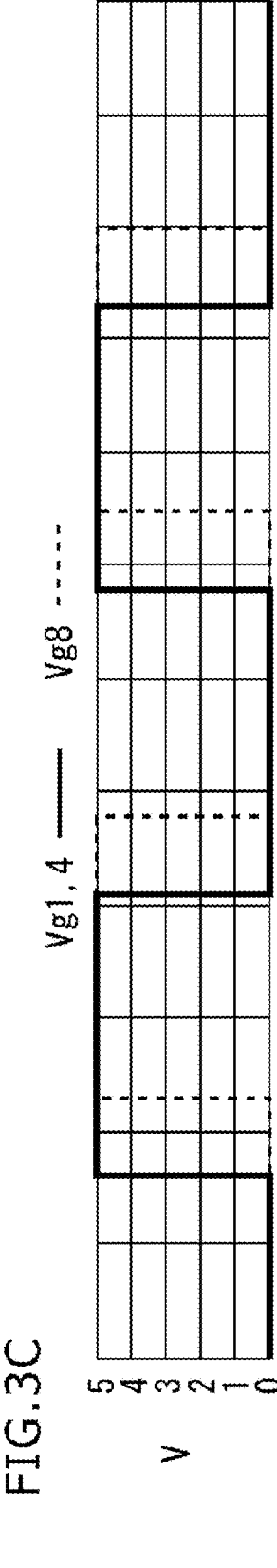

FIG. 3B and FIG. 3C are graphs showing the transitions of control signals at the gate terminal of the switching elements Qn (n=1 to 8). The solid line indicated in the graph of FIG. 3B represents the transition of voltage values (Vg2, Vg3) of the control signals input to the gate terminals of the switching elements Q2 and Q3 in the first full bridge circuit 11, and the broken line indicated in the graph represents the transition of a voltage value (Vg7) of the control signal input to the gate terminal of the switching element Q7 in the second full bridge circuit 12. The control signal input to the gate terminal of the switching element Q7 is controlled to rise after a predetermined period of time has elapsed from the rise of the control signal input to the gate terminals of the switching elements Q2 and Q3 in the first full bridge circuit 11, for example. In the DC/DC converter 10, the predetermined period is changed so that the output voltage Vo and the output current output after the step-up reach target values.

Also, the solid line indicated in the graph of FIG. 3C illustrates the transition of voltage values (Vg1, Vg4) of the control signals input to the gate terminals of the switching elements Q1 and Q4 in the first full bridge circuit 11, and the broken line indicated in the graph illustrates the transition of a voltage value (Vg8) of the control signal input to the gate terminal of the switching element Q8 in the second full bridge circuit 12. In FIG. 3C also, the control signal input to the gate terminal of the switching element Q8 is controlled to rise after a predetermined period of time has elapsed from the rise of the control signal input to the gate terminals of the switching elements Q1 and Q4 in the first full bridge circuit 11, for example. In the DC/DC converter 10, the predetermined period is changed so that the output voltage Vo and the output current output after the step-up reach target values. In FIG. 3B and FIG. 3C, the switching elements Q5 and Q6 are controlled to be OFF (the circuit is open between the drain terminal and the source terminal).

Figure 3D:
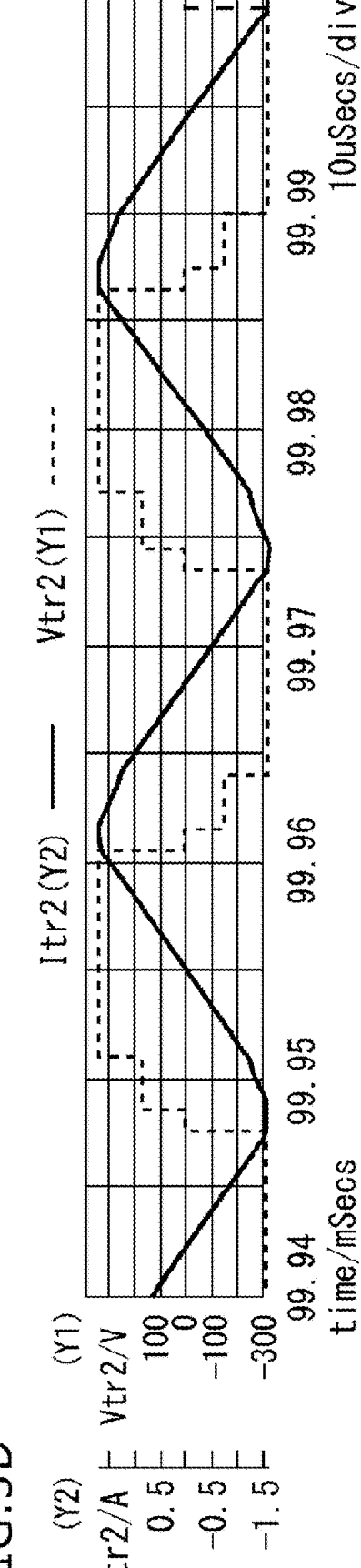

FIG. 3D is a graph showing the transition of a voltage (Vtr2) in the excitation inductance Lm and a current (Itr2) flowing through the excitation inductance Lm. In FIG. 3D, the transition of the voltage (Vtr2) in the excitation inductance Lm is represented by the broken line indicated in the graph, and the transition of the current (Itr2) flowing through the excitation inductance Lm is represented by the solid line indicated in the graph. As shown by the broken line graph in FIG. 3D, it can be seen that the voltage value of the voltage (Vtr2) at the excitation inductance Lm of the transformer TR fluctuates stepwise at predetermined steps due to the switching operation of the switching elements Q1 to Q8. In addition, it can be seen that the current (Itr2) flowing through the excitation inductance Lm illustrated in the solid line graph also fluctuates sinusoidally within a predetermined range (±1.5 A in FIG. 3D) in accordance with the switching operation of the switching elements Q1 to Q8. In the DAB DC/DC converter 10, the average value of the excitation current Im is 0 when power conversion is performed by ideal switching as illustrated in FIG. 3A, FIG. 3B, FIG. 3C and FIG. 3D, and magnetic bias due to the direct current components does not occur. However, in the switching elements (Q1 to Q8) constituting the DC/DC converter 10, there is an individual difference between devices regarding switching at the time of step-up/step-down conversion. Thus, at the time of power conversion (step-up conversion, step-down conversion), direct current components caused by individual differences between the switching elements (Q1 to Q8) constituting the DC/DC converter 10 may occur in the transformer TR.

Figure 4A:
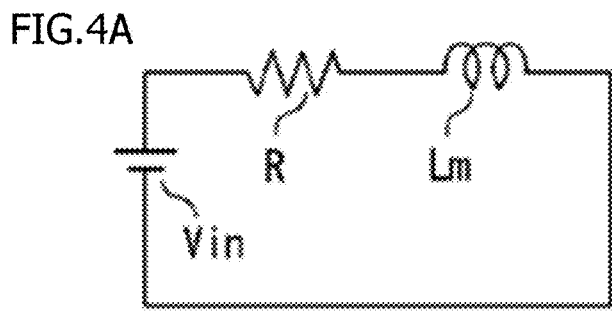
FIG. 4A, FIG. 4B and FIG. 4C are diagrams for describing magnetic bias using a simplified circuit model of the transformer according to an embodiment of the present invention.
Figure 4B:
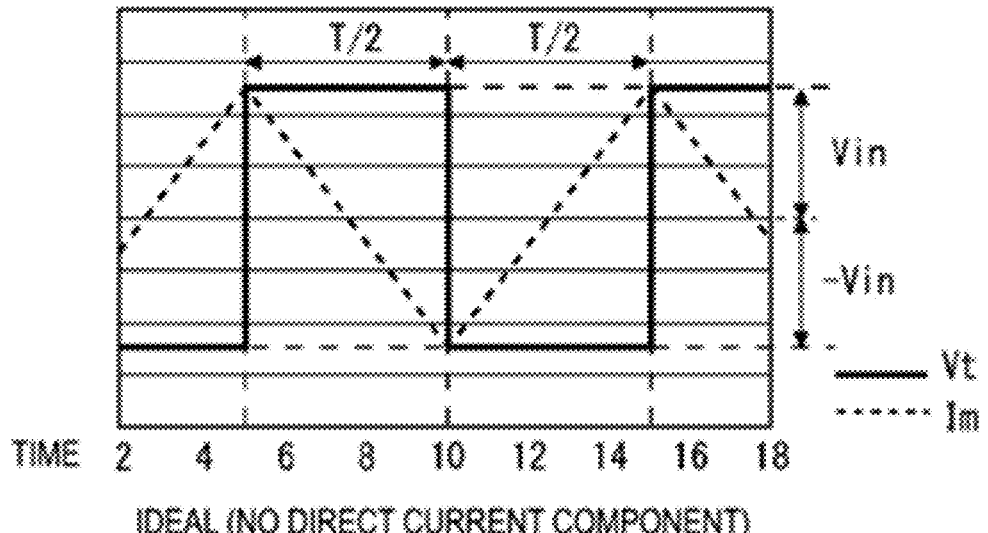
Figure 4C:
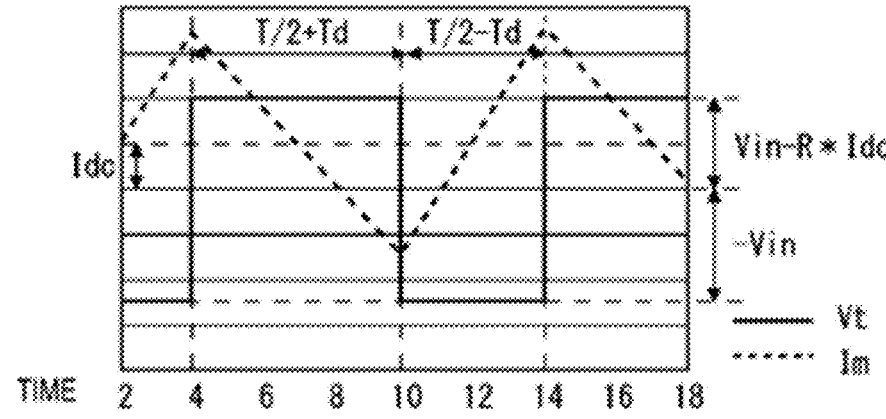

FIG. 4A, FIG. 4B and FIG. 4C are diagrams for describing magnetic bias using a simplified circuit model of the transformer TR. FIG. 4A illustrates a circuit model in which a second end of an impedance R and a first end of the excitation inductance Lm are connected in series and a voltage Vin is applied between the first end of the impedance R and the second end of the excitation inductance Lm. In the circuit model of FIG. 4A, the voltage Vin fluctuates when the switching elements Qn (n=1 to 8) perform switching, which causes a voltage Vt applied to the excitation inductance Lm and the excitation current Im to fluctuate.

FIG. 4B is a diagram for describing a state in which ideal switching is performed in the circuit model of FIG. 4A. In FIG. 4B, the vertical axis represents the relative magnitude of the current or voltage, and the horizontal axis represents the passage of time. The solid line indicated in the graph of FIG. 4B represents the transition of the voltage Vt applied to the excitation inductance Lm by switching, and the broken line indicated in the graph represents the transition of the current Im flowing through the excitation inductance Lm by switching. By switching, the voltage Vt applied to the excitation inductance Lm fluctuates symmetrically between positive and negative within a predetermined range (±Vin). When the switching period of the switching is "T", the voltage Vt fluctuates in a rectangular shape from "−Vin" to "+Vin" every period "T/2". The current Im flowing through the excitation inductance Lm also fluctuates in a triangular waveform that is symmetrical in the positive and negative directions, with a positive peak value when the voltage Vt reaches the voltage value "+Vin" and a negative peak value when the voltage Vt reaches the voltage value "−Vin". In this manner, when ideal switching is performed, the current Im flowing through the excitation inductance Lm fluctuates symmetrically between positive and negative, and the direct current component is 0.

FIG. 4C is a diagram for describing a case where a shift occurs in the switching timing due to an individual difference in the circuit model of FIG. 4A. The vertical axis and the horizontal axis and the graphs indicated by the solid line and the broken line in FIG. 4C are the same as those in FIG. 4B. Due to individual differences existing between the switching elements (Q1 to Q8), a shift may occur in the switching timing of switching at the time of power conversion. Such a shift in switching appears as a shift (delay) in the timing of switching from current flowing between the drain terminal and the source terminal to the circuit being open between the drain terminal and the source terminal in the switching period (T). The shift amount (delay amount) in the switching period is represented by "Td".

As shown by the solid line graph in FIG. 4C, the delay amount Td is added to the period (T/2) at the timing of switching from current flowing between the drain terminal and the source terminal to the circuit being open between the drain terminal and the source terminal. Thus, the conduction period between the drain and source terminals within the switching period (T) becomes relatively long, as represented by "T/2+Td". On the other hand, the delay amount Td is subtracted from the period (T/2) at the timing of switching from the circuit being open between the drain terminal and the source terminal to current flowing between the drain terminal and the source terminal. Thus, the open period between the drain and source terminals within the switching period (T) becomes relatively short, as represented by "T/2−Td". In the transformer TR, the current caused by the voltage Vt applied during the conduction period corresponding to the delay amount Td appears as a direct current component Idc generated in the excitation inductance Lm. The direct current component generated in the transformer TR is superimposed on the voltage value on the positive side as a voltage drop of "R×Idc" using the impedance R. In an ideal state, the voltage Vt that fluctuates symmetrically within the range from "+Vin" to "−Vin" drops, and an asymmetric voltage that fluctuates within the range from "+Vin−R×Idc" to "−Vin" is applied to the excitation inductance Lm.

Further, the excitation current Im that fluctuates asymmetrically between positive and negative flows through the excitation inductance Lm with the direct current component Idc as shown in FIG. 4C in a manner that the positive peak value is reached when the voltage Vt reaches the voltage value "+Vin" and the negative peak value is reached when the voltage Vt reaches the voltage value "−Vin". In FIG. 4C, the current flowing through the excitation inductance Lm fluctuates as a triangular waveform high on the positive side because the positive-side direct current component Idc is superimposed.

(Magnetic Bias Suppression)

Figure 5:
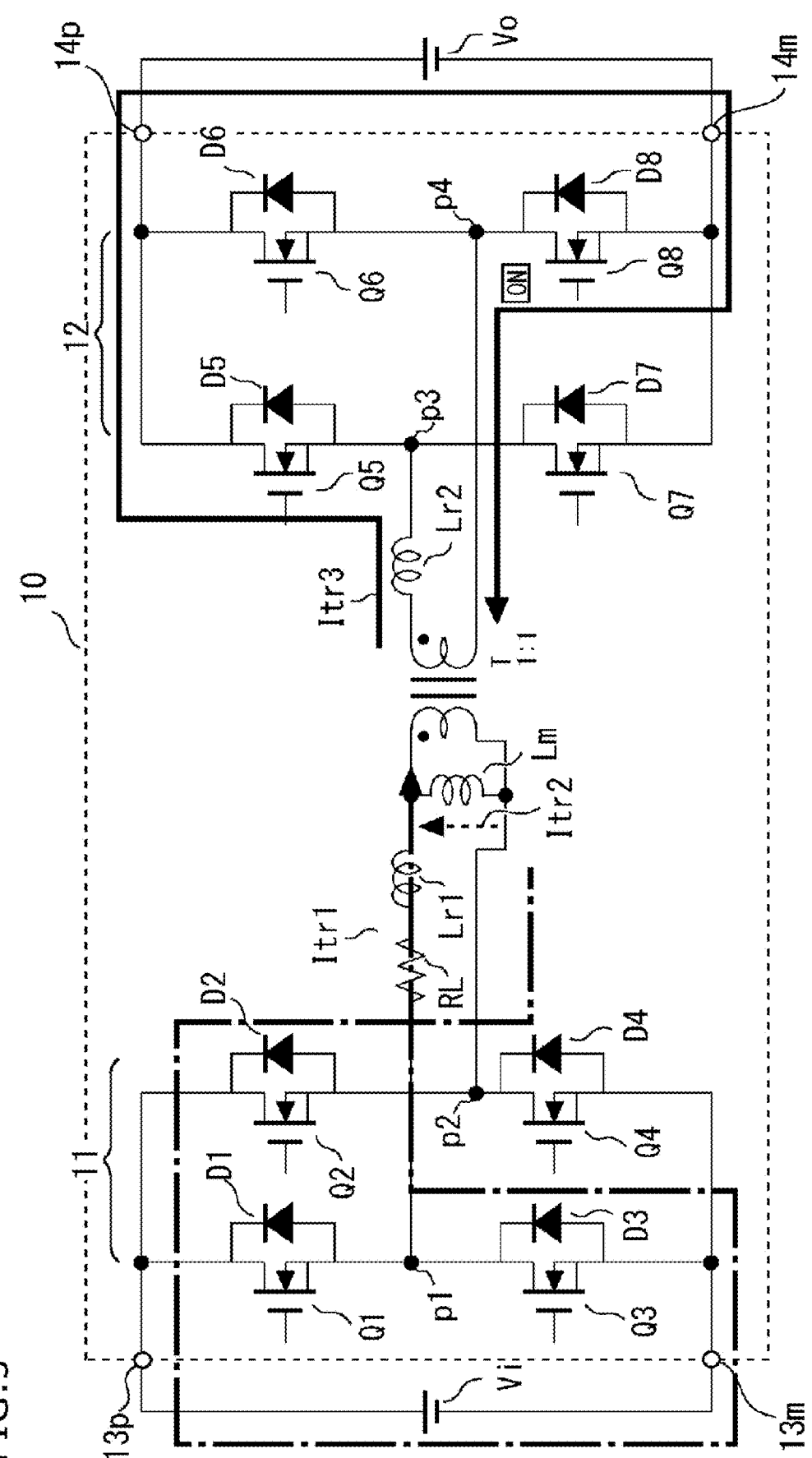
FIG. 5 is a diagram illustrating a flow of current in the DC/DC converter functioning as a step-up converter according to the embodiment of the present invention.

Next, with reference to FIG. 5, FIG. 6A, FIG. 6B, FIG. 7A and FIG. 7B, suppressing magnetic bias in the transformer TR of the DC/DC converter 10 according to the present embodiment will be described. FIG. 5 is a diagram illustrating the flow of current in the DC/DC converter 10 functioning as a step-up converter. As illustrated in FIG. 3B and FIG. 3C, each switching element of the DC/DC converter 10 is controlled by applying a voltage to the gate terminal so that a current flows between the drain terminal and the source terminal (also referred to as "ON") or the circuit is open between the drain terminal and the source terminal (also referred to as "OFF"), and the input voltage Vi applied to the first input/output terminal pair 13 is stepped up and the output voltage Vo is output to the second input/output terminal pair 14.

In FIG. 5, the flow of current indicated by a thick dot-dash line arrow represents the current Itr1 flowing through the first full bridge circuit 11 and the primary side of the transformer TR, and the flow of current indicated by a thick solid line arrow represents the current Itr3 flowing through the secondary side of the transformer TR and the second full bridge circuit 12. The broken line arrow represents the excitation current Itr2 flowing through the excitation inductance. In FIG. 5, it is assumed that magnetic bias occurs in the transformer TR, and the excitation current Itr2 fluctuates between positive and negative. That is, the state in FIG. 5 is a state immediately after switching from the control state illustrated in FIG. 3C in which the switching elements Q1 and Q4 are ON in the first full bridge circuit 11 and the switching element Q8 is ON in the second full bridge circuit 12 to the control state illustrated in FIG. 3B. In this state, the switching element Q8 is ON. In the control state illustrated in FIG. 3B, control is performed such that the switching elements Q2 and Q3 of the first full bridge circuit 11 are ON, the switching element Q8 of the second full bridge circuit 12 is switched from ON to OFF, and the switching element Q7 is ON.

As represented by the thick dot-dash line arrow, the current Itr1 flows in order from the transformer TR (primary side), the connection point p2, the switching element Q2, the input/output terminal 13p, the input voltage Vi, the input/output terminal 13m, the switching element Q3, the connection point p1, the impedance RL, the first reactor Lr1, and the transformer TR (primary side). Since the switching element Q8 is kept ON, the current Itr3 flows in order from the transformer TR (secondary side), the second reactor Lr2, the connection point p3, the switching element Q5 (diode D5), the input/output terminal 14p, the output voltage Vo, the input/output terminal 14m, the switching element Q8, the connection point p4, and the transformer TR (secondary side), as represented by the thick solid line arrow.

Here, a dead time for preventing an arm short circuit is set for each switching element constituting the first full bridge circuit 11 and the second full bridge circuit 12. That is, the switching elements Q1 and Q3 constituting the first leg L1 of the first full bridge circuit 11 and the switching elements Q2 and Q4 constituting the second leg L2 are provided with dead times for arm short circuit prevention. Similarly, the switching elements Q5 and Q7 constituting the third leg L3 of the second full bridge circuit 12 and the switching elements Q6 and Q8 constituting the fourth leg L4 are provided with dead times for arm short circuit prevention. In the first leg L1, the dead time is set as, for example, a simultaneous OFF period for the switching elements Q1 and Q3. Setting this simultaneous OFF period makes it possible to prevent arm short circuiting caused by the switching elements Q1 and Q3 being simultaneously ON. The same applies to the other legs.

In the power converter 1 according to the present embodiment, when magnetic bias occurs in the transformer TR, the magnetic bias is suppressed by operating the dead time of each switching element related to step-up switching and step-down switching on a leg-by-leg basis. To be more specific, the duration of the dead time period is increased or decreased on a leg-by-leg basis so that the direct current components included in the excitation current Itr2 of the transformer TR decrease, and the voltage applied to the excitation inductance Lm is controlled.

Figures 6A, 6B:
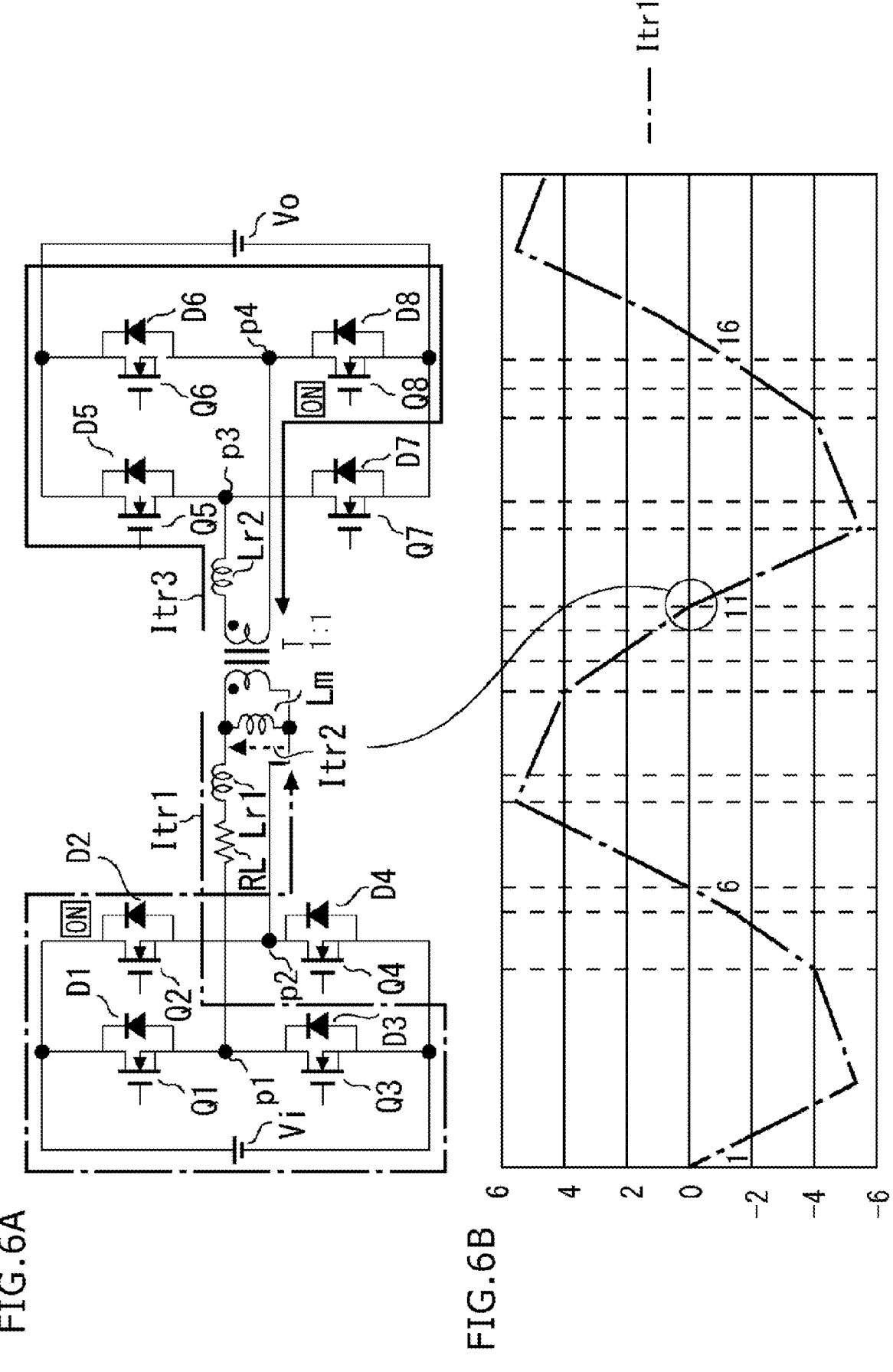
FIG. 6A and FIG. 6B are diagrams for describing a flow of current when dead time of a second leg according to the embodiment of the present invention is relatively small.

The suppression of magnetic bias by the duration of the dead time will be described with reference to FIG. 6A, FIG. 6B, FIG. 7A and FIG. 7B. FIG. 6A and FIG. 6B are diagrams for describing the flow of the current Itr1 when the dead time set for the switching elements Q2 and Q4 is relatively small (the dead time period is short). In FIG. 6A, the current path of the current Itr1 is represented by a dot-dash line arrow, and FIG. 6B is an example of a graph showing the transition of the current Itr1. Note that in FIG. 6A, the first input/output terminal pair 13 (input/output terminals 13p and 13m) and the second input/output terminal pair 14 (input/output terminals 14p and 14m) illustrated in FIG. 5 are not illustrated. In FIG. 6B, the vertical axis represents the magnitude of the current, and the horizontal axis represents the passage of time. The portion surrounded by a solid line circle in FIG. 6B represents the timing at which the current Itr1 transitions from the positive side to the negative side and the value of the current Itr1 becomes zero.

As illustrated in FIG. 6B, in a case where the dead time period set for the switching elements Q2 and Q4 is relatively short, the switching element Q2 is turned ON before the timing at which the value of the current Itr1 transitioning from the positive side to the negative side becomes zero, and the current Itr1 flows along a current path represented by the thick dot-dash line arrow in FIG. 6A. That is, the current path of the current Itr1 flows in order from the transformer TR (primary side), the first reactor Lr1, the impedance RL, the connection point p1, the switching element Q3, the input voltage Vi, the switching element Q2, the connection point p2, and the transformer TR (primary side). Thus, as illustrated in FIG. 6B, the current Itr1 continuously transitions from the positive side to the negative side.

Figures 7A, 7B:
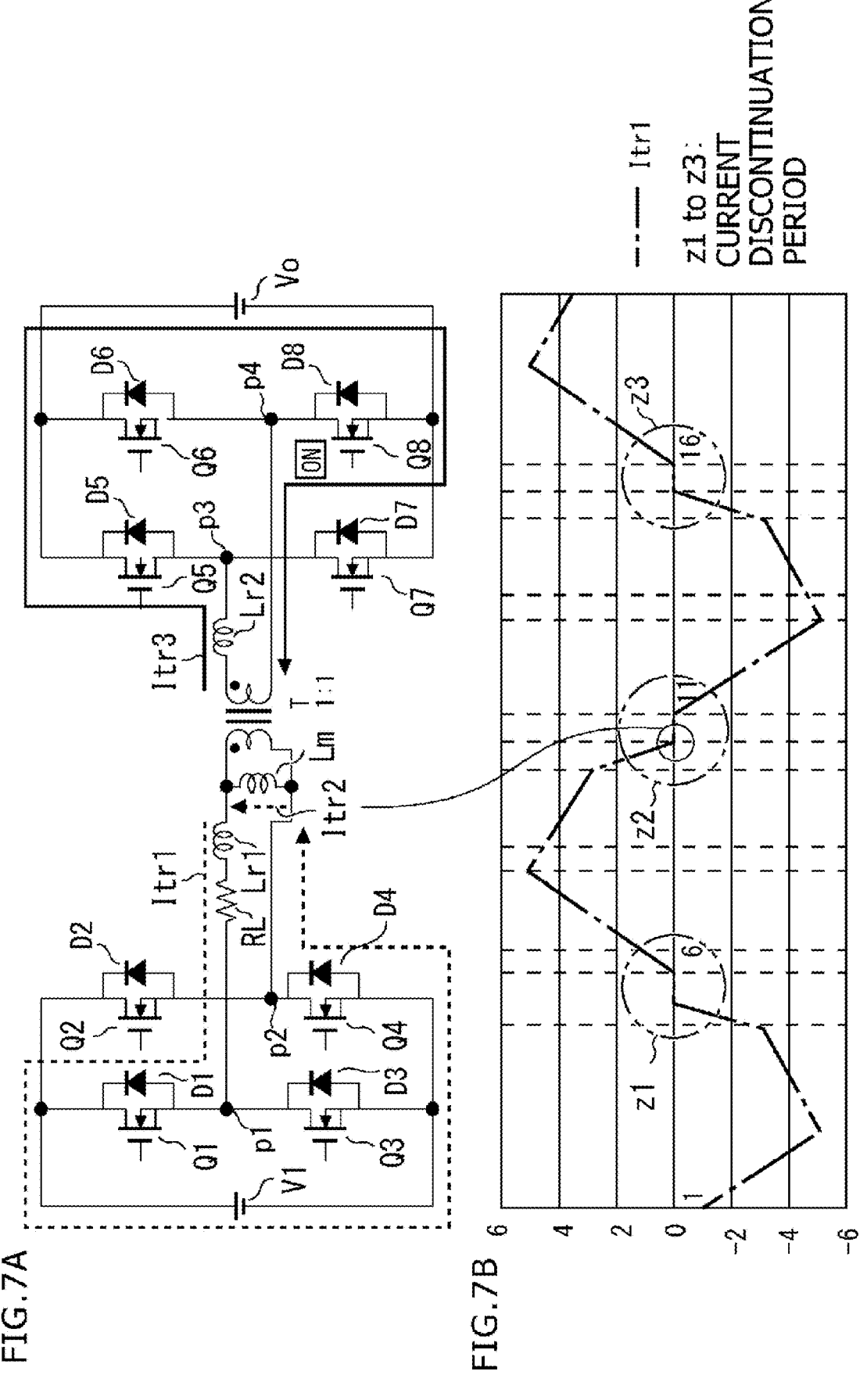
FIG. 7A and FIG. 7B are diagrams for describing a flow of current when dead time of the second leg according to the embodiment of the present invention is relatively large.

FIG. 7A and FIG. 7B are diagrams for describing the flow of the current Itr1 when the dead time set for the switching elements Q2 and Q4 is relatively large (the dead time period is long). In FIG. 7A, the current path of the current Itr1 is represented by a dashed line arrow, and FIG. 7B is an example of a graph showing the transition of the current Itr1. In FIG. 7A, the first input/output terminal pair 13 (input/output terminals 13p and 13m) and the second input/output terminal pair 14 (input/output terminals 14p and 14m) illustrated in FIG. 5 are omitted. In FIG. 7B, the vertical axis represents the magnitude of the current, and the horizontal axis represents the passage of time. The portions indicated by the two-dot dash line circles z1 to z3 in FIG. 7B represent the timing at which the current Itr1 transitions from the positive side to the negative side and the value of the current Itr1 is maintained at zero (current discontinuation period in which no current flows).

As illustrated in FIG. 7A and FIG. 7B, in a case where the dead time period set for the switching elements Q2 and Q4 is relatively long, it is possible to provide the current discontinuation periods (the two-dot dash line circles z1 to z3 in FIG. 7B) in which, before the switching element Q2 is turned ON, the value of the current Itr1 transitioning from the positive side to the negative side becomes zero (solid line circle in FIG. 7B) and is maintained at zero with no current flowing until the dead time period elapses. However, in the current discontinuation period, a very small amount of current flows as a current or an excitation current caused by parasitic components or the like of the devices (the transformer TR and the switching elements Q1 to Q4) (these currents are ignored in FIG. 7B). On this current path, the current flows in order from the transformer TR (primary side), the first reactor Lr1, the impedance RL, the connection point p1, the diode D1, the input voltage Vi, the diode D4, the connection point p2, and the transformer TR (primary side), as represented by the broken line arrow in FIG. 7A. In the present embodiment, the period referred to as the current discontinuation period includes a state in which a very small amount of current caused by a parasitic component or the like of the device (a current or excitation current caused by a parasitic component or the like of the device) flows.

When the current path represented by the broken line arrow in FIG. 7A is compared with the current path represented by the dot-dash line arrow in FIG. 6A, it can be seen that the positive/negative polarity of the voltage applied to the excitation inductance Lm is reversed. That is, in FIG. 6A, the first end of the excitation inductance Lm connected to the first reactor Lr1 is connected to the negative electrode side of the input voltage Vi, and the second end is connected to the positive electrode side of the input voltage Vi. On the other hand, in FIG. 7A, the first end of the excitation inductance Lm connected to the first reactor Lr1 is connected to the positive electrode side of the input voltage Vi, and the second end is connected to the negative electrode side of the input voltage Vi.

In the present embodiment, when the magnetic bias (direct current component of the excitation current) occurs, the dead time period of each switching element related to the step-up operation and the step-down operation are varied on a leg-by-leg basis to apply a voltage in a direction that reduces the direct current component of the excitation current Itr2 flowing through the excitation inductance Lm, thereby suppressing the magnetic bias occurring in the transformer TR.

(Output Fluctuation at Time of Step-Up/Step-Down Switching)

With the power converter 1 the present embodiment is premised on, for example, it is possible to switch between the step-up operation and the step-down operation by relatively changing the phase shift amount related to the ON/OFF state of each switching element included in the first leg L1 to the fourth leg L4. For example, when the operation of the DC/DC converter 10 is switched from the step-down operation to the step-up operation with the first input/output terminal pair 13 as the primary side and the second input/output terminal pair 14 as the secondary side, the phase shift amount of the second leg L2 with respect to the first leg L1 is reduced to zero. Then, while the phase shift amount of the second leg L2 with respect to the first leg L1 is maintained at zero, the phase shift amount of the fourth leg L4 with respect to the second leg L2 is adjusted from zero to a desired phase value. Here, the phase shift amount of the second leg L2 with respect to the first leg L1 can be expressed as a delay amount (TΦ) between a falling timing at which the switching element Q3 changes from ON to OFF and a falling timing at which the switching element Q4 changes from ON to OFF. Also, the phase shift amount of the fourth leg L4 with respect to the second leg L2 can be expressed as a delay amount (TΦ) between a falling timing at which the switching element Q4 changes from ON to OFF and a falling timing at which the switching element Q8 changes from ON to OFF. Since the ON/OFF state of the switching element Qn (n=1 to 8) changes in a predetermined period (T), the delay amount (T) can also be expressed as a phase advance amount (TΦ).

Also, for example, when the operation of the DC/DC converter 10 is switched from the step-up operation to the step-down operation with the first input/output terminal pair 13 as the primary side and the second input/output terminal pair 14 as the secondary side, the phase shift amount of the fourth leg L4 with respect to the second leg L2 is reduced to zero. Then, while the phase shift amount of the fourth leg L4 with respect to the second leg L2 is maintained at zero, the phase shift amount of the first leg L1 with respect to the second leg L2 is adjusted from zero to a desired phase value. In this manner, in the power converter 1, since the phase shift amount related to the ON/OFF state of each switching element included in the first leg L1 to the fourth leg L4 is relatively changed, the operation can be continuously switched between the step-up/step-down operation.

In the following description, both "step-up operation" and "step-down operation" in the DC/DC converter 10 represent an operation by a switching pattern related to the ON/OFF state of the switching elements included in the first leg L1 to the fourth leg L4 and do not represent a relationship between the input voltage and the output voltage for voltage conversion. That is, in the present embodiment, the DC/DC converter 10 may operate with the input voltage being greater than the output voltage in the "step-up operation", and may also operate with the input voltage being less than the output voltage in the "step-down operation". The step-up operation and the step-down operation of the DC/DC converter 10 are also referred to as a "step-up mode" and a "step-down mode", respectively. In addition, hereinafter, switching from the step-up mode to the step-down mode is performed with the minimum phase shift amount TΦ from the step-up mode side (the maximum phase shift amount TΦ from the step-down mode side). The step-up mode in which the phase shift amount is the minimum TΦ is also referred to as "step-up mode minimum TΦ", and the step-down mode in which the phase shift amount is the maximum TΦ is referred to as "step-down mode maximum TΦ".

With the DC/DC converter 10 of the power converter 1 on which the present embodiment is based, the current path in the step-up mode and the current path in the step-down mode are different from each other, and the waveforms of the current flowing through the transformer TR are also different. Thus, for example, when the operation mode is switched from the step-up mode minimum TΦ to the step-down mode maximum TΦ, a difference in output occurs. Hereinafter, the output fluctuation of the DC/DC converter 10 at the time of switching between step-up and step-down modes will be described with reference to FIG. 8A, FIG. 8B, FIG. 9A, FIG. 9B, FIG. 10, FIG. 11A, FIG. 11B, FIG. 12A, FIG. 12B and FIG. 13.

Figure 8A:
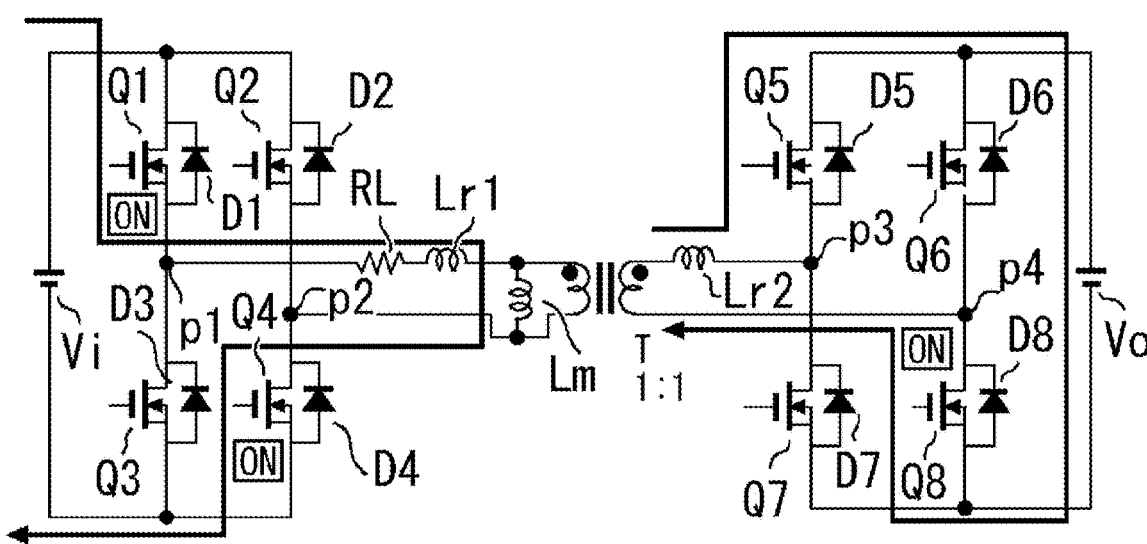
FIG. 8A and FIG. 8B are diagrams for describing a current path in a step-up mode of the power converter according to the embodiment of the present invention.
Figure 8B:
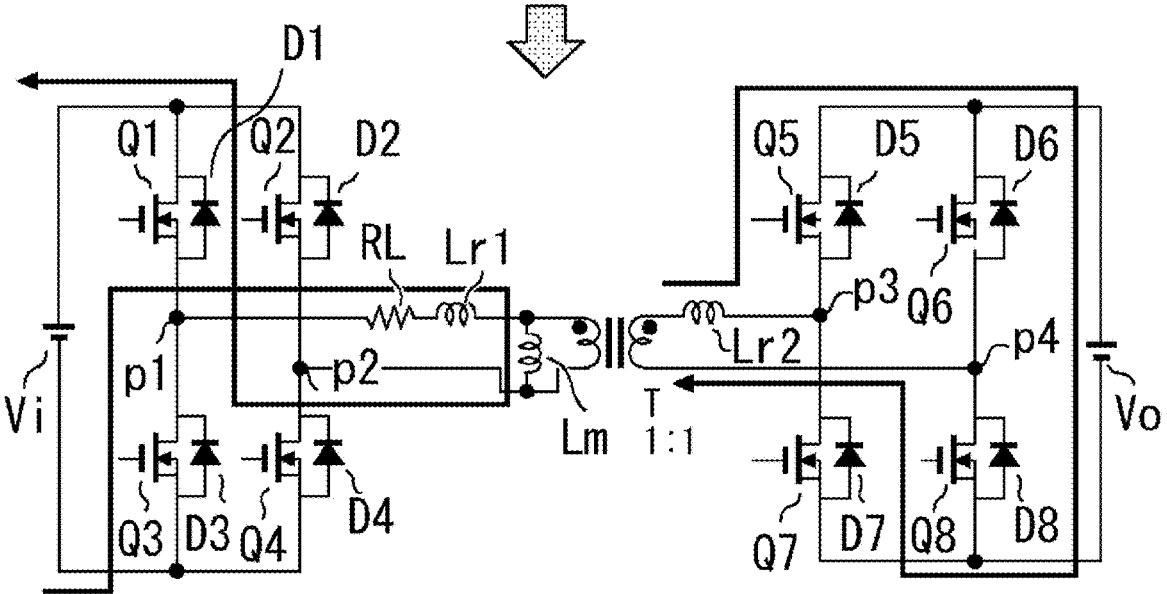

First, an output difference occurring on the positive side of the transformer current will be described with reference to FIG. 8A, FIG. 8B, FIG. 9A, FIG. 9B and FIG. 10. FIG. 8A and FIG. 8B are diagrams for describing a current path in the step-up mode. In FIG. 8A, a current path in a case where the switching elements Q1 and Q4 of the first full bridge circuit 11 are ON and the switching element Q8 of the second full bridge circuit 12 is ON is represented by a solid line arrow, and in FIG. 8B, a current path during a dead time after the switching illustrated in FIG. 8A is represented by a solid line arrow.

As represented by the solid line arrow in FIG. 8A, in the first full bridge circuit 11, a current flows through the current path in the order of the input voltage Vi (positive electrode side), the switching element Q1, the connection point p1, the impedance RL, the first reactor Lr1, the excitation inductance Lm, the connection point p2, the switching element Q4, and the input voltage Vi (negative electrode side). Similarly, in the second full bridge circuit 12, a current flows through the current path in the order of the transformer TR (secondary side), the second reactor Lr2, the connection point p3, the diode D5, the output voltage Vo, the switching element Q8, the connection point p4, and the transformer TR (secondary side).

In the dead time, as represented by the solid line arrow in FIG. 8B, in the first full bridge circuit 11, a current flows through the current path in the order of the input voltage Vi (negative electrode side), the diode D3, the connection point p1, the impedance RL, the first reactor Lr1, the excitation inductance Lm, the connection point p2, the diode D2, and the input voltage Vi (positive electrode side). This current is caused by, for example, energy accumulated in the excitation inductance Lm of the transformer TR, the first reactor Lr1, the parasitic capacitance of the device, and the like. Similarly, in the second full bridge circuit 12, a current flows through the current path in the order of the transformer TR (secondary side), the second reactor Lr2, the connection point p3, the diode D5, the output voltage Vo, the diode D8, the connection point p4, and the transformer TR (secondary side).

Figure 9A:
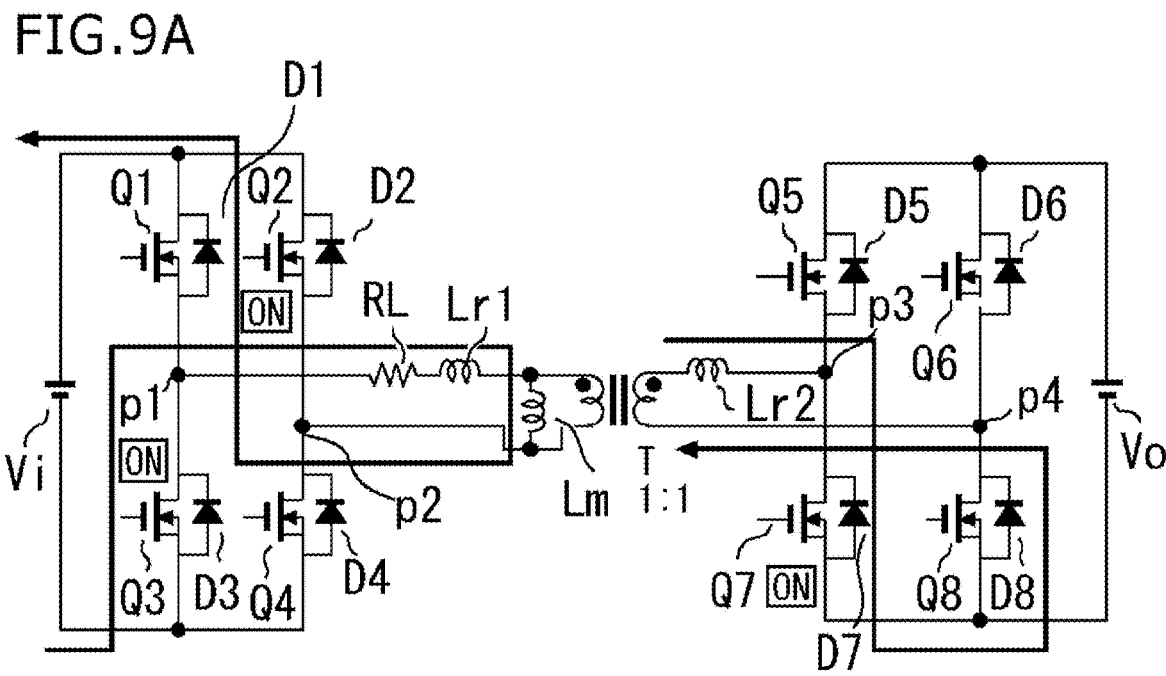
FIG. 9A and FIG. 9B are diagrams for describing current paths in a switching step-up mode minimum TΦ and a step-down mode maximum TΦ of the power converter according to the embodiment of the present invention.
Figure 9B:
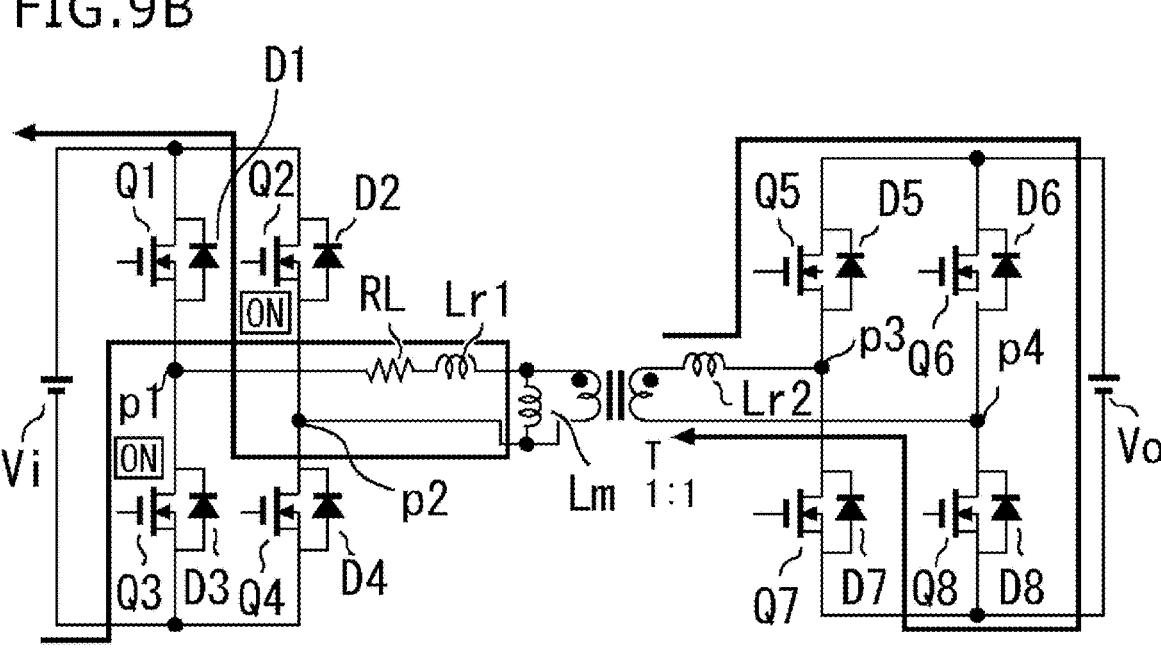

FIG. 9A and FIG. 9B are diagrams for describing the current paths in the step-up mode minimum TΦ and the step-down mode maximum TΦ. FIG. 9A represents a current path in the step-up mode minimum TΦ, and FIG. 9B represents a current path in the step-down mode maximum TΦ. In FIG. 9A and FIG. 9B, the current paths are represented by solid line arrows. Note that the current path in the step-up mode minimum TΦ and the current path in the step-down mode maximum TΦ are current paths formed in a state of transition after the dead time illustrated in FIG. 8B.

In the step-up mode minimum TΦ, the switching elements Q2 and Q3 of the first full bridge circuit 11 are ON and the switching element Q7 of the second full bridge circuit 12 is ON, as illustrated in FIG. 9A. As represented by the solid line arrow, in the first full bridge circuit 11, a current flows through the current path in the order of the input voltage Vi (negative electrode side), the switching element Q3, the connection point p1, the impedance RL, the first reactor Lr1, the excitation inductance Lm, the connection point p2, the switching element Q2, and the input voltage Vi (positive electrode side). Also, in the second full bridge circuit 12, a current flows through the current path in the order of the transformer TR (secondary side), the second reactor Lr2, the connection point p3, the switching element Q7, the diode D8, the connection point p4, and the transformer TR (secondary side).

In the step-down mode maximum TΦ, the switching elements Q2 and Q3 of the first full bridge circuit 11 are controlled to be ON and the switching element Qn (n=5 to 8) of the second full bridge circuit 12 is controlled to be OFF, as illustrated in FIG. 9B. Thus, in the first full bridge circuit 11 in the step-down mode maximum TΦ, a current flows through a current path similar to that of the step-up mode minimum TΦ illustrated in FIG. 9A. However, in the second full bridge circuit 12 in the step-down mode maximum TΦ, since the switching element Qn (n=5 to 8) is controlled to be OFF, a current flows through the current path in the order of the transformer TR (secondary side), the second reactor Lr2, the connection point p3, the diode D5, the output voltage Vo, the diode D8, the connection point p4, and the transformer TR (secondary side).

When the current paths illustrated in FIG. 9A and FIG. 9B are compared with each other, the current paths on the first full bridge circuit 11 side are similar, but the current paths on the second full bridge circuit 12 side differ in terms of the step-up mode minimum TΦ and the step-down mode maximum TΦ. Thus, when the operation mode is switched from the step-up mode minimum TΦ to the step-down mode maximum TΦ, an output difference occurs in the current flowing through the transformer TR.

Figure 10:
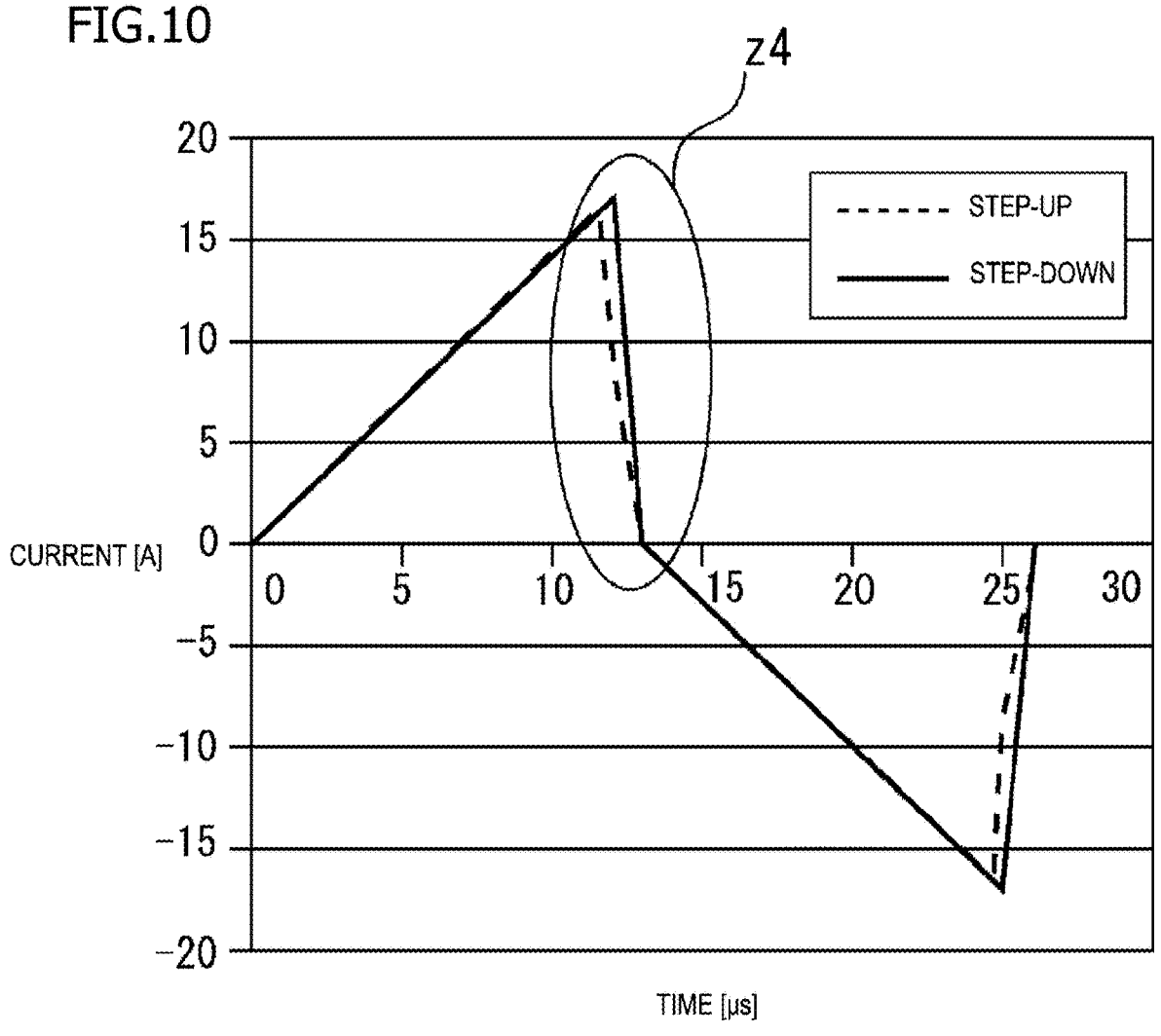
FIG. 10 is a graph showing the transition of the current in the step-up mode minimum TΦ and the step-down mode maximum TΦ of the power converter according to the embodiment of the present invention.

FIG. 10 is a graph showing the transition of the current in the step-up mode minimum TΦ and the step-down mode maximum TΦ. The vertical axis represents the magnitude of the current (A), and the horizontal axis represents the passage of time (μs). In FIG. 10, the broken line indicated in the graph represents the transition of the current flowing through the transformer TR in the step-up mode minimum TΦ, and the solid line indicated in the graph represents the transition of the current flowing through the transformer TR in the step-down mode maximum TΦ. As indicated by the region surrounded by a solid line ellipse z4, it can be seen that there is a difference in output of the current flowing through the transformer TR such that the step-down mode maximum TΦ is greater than the step-up mode minimum TΦ. The current positive peak value of the step-up mode minimum TΦ is smaller than that of the step-down mode maximum TΦ, and the decreasing slope until the value of the current reaches zero after the peak value is also gentler than that of the step-down mode maximum TΦ.

Figure 11A:
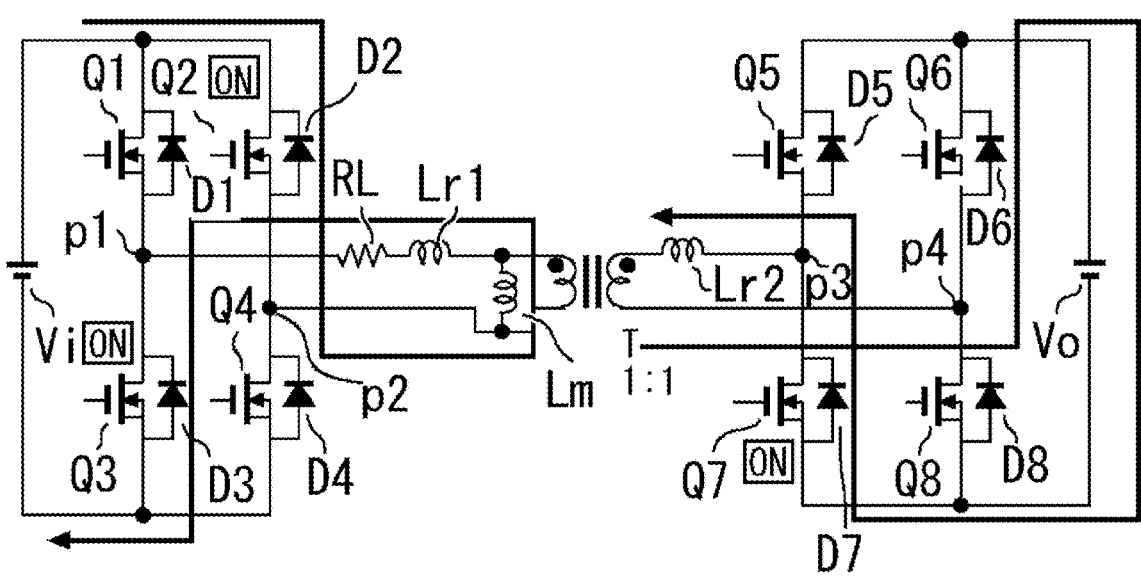
FIG. 11A and FIG. 11B are diagrams for describing a current path in the step-up mode of the power converter according to the embodiment of the present invention.
Figure 11B:
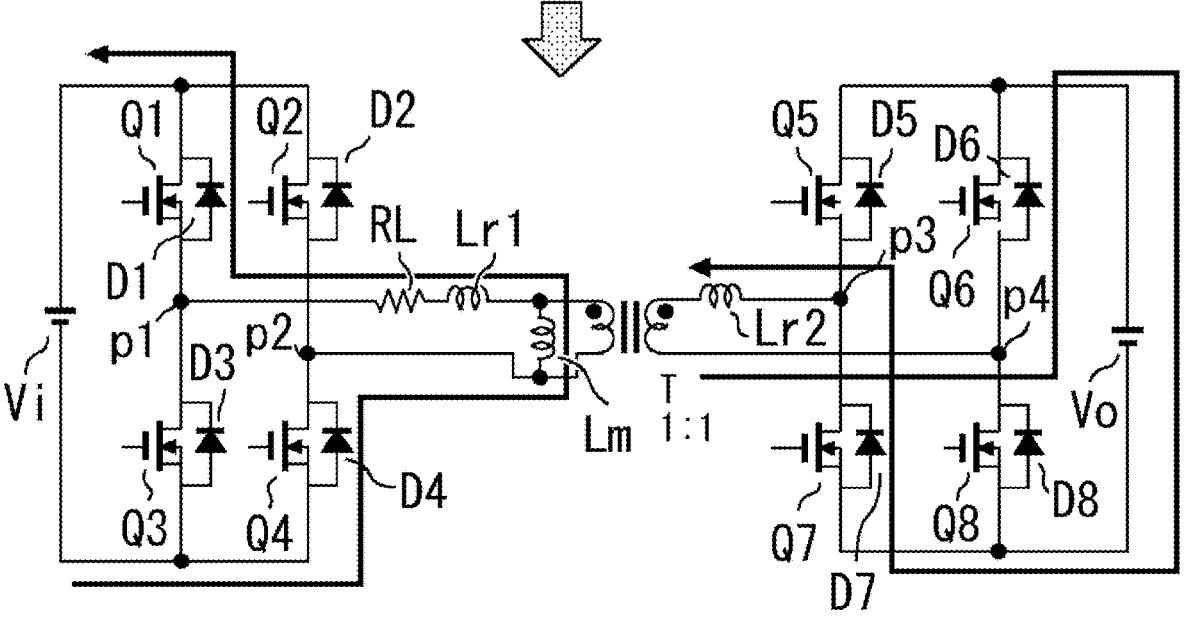

Next, an output difference occurring on the negative side of the transformer current will be described. FIG. 11A and FIG. 11B are diagrams for describing a current path in the step-up mode. In FIG. 11A, a current path in a case where the switching elements Q2 and Q3 of the first full bridge circuit 11 are ON and the switching element Q7 of the second full bridge circuit 12 is ON is represented by a solid line arrow, and in FIG. 11B, a current path during a dead time after the switching illustrated in FIG. 11A is represented by a solid line arrow.

As represented by the solid line arrow in FIG. 11A, in the first full bridge circuit 11, a current flows through the current path in the order of the input voltage Vi (positive electrode side), the switching element Q2, the connection point p2, the excitation inductance Lm, the first reactor Lr1, the imped- ance RL, the connection point p1, the switching element Q3, and the input voltage Vi (negative electrode side). Similarly, in the second full bridge circuit 12, a current flows through the current path in the order of the transformer TR (second- ary side), the connection point p4, the diode D6, the output voltage Vo, the switching element Q7, the connection point p3, the second reactor Lr2, and the transformer TR (sec- ondary side).

In the dead time, as represented by the solid line arrow in FIG. 11B, in the first full bridge circuit 11, a current flows through the current path in the order of the input voltage Vi (negative electrode side), the diode D4, the connection point p2, the excitation inductance Lm, the first reactor Lr1, the impedance RL, the connection point p1, the diode D1, and the input voltage Vi (positive electrode side). In FIG. 11B also, this current is caused by energy accumulated in the excitation inductance Lm of the transformer TR, the first reactor Lr1, and the parasitic capacitance or the like of the device. Similarly, in the second full bridge circuit 12, a current flows through the current path in the order of the transformer TR (secondary side), the connection point p4, the diode D6, the output voltage Vo, the diode D7, the connection point p3, the second reactor Lr2, and the trans- former TR (secondary side).

Figure 12A:
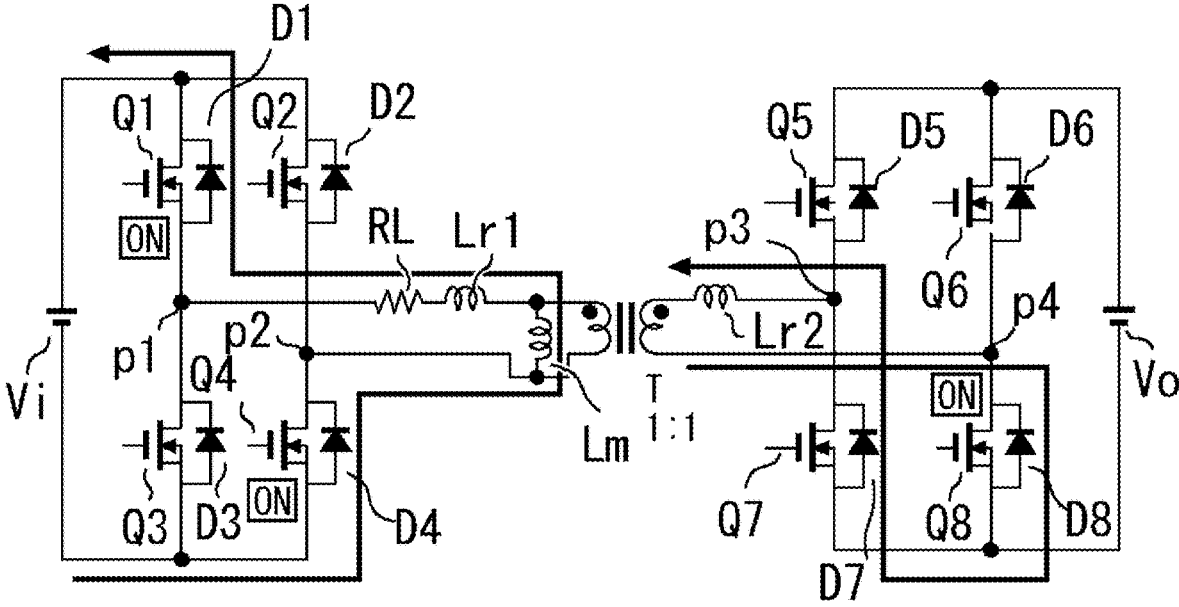
FIG. 12A and FIG. 12B are diagrams for describing the current paths in the step-up mode minimum TΦ and the step-down mode maximum TΦ of the power converter according to the embodiment of the present invention.
Figure 12B:
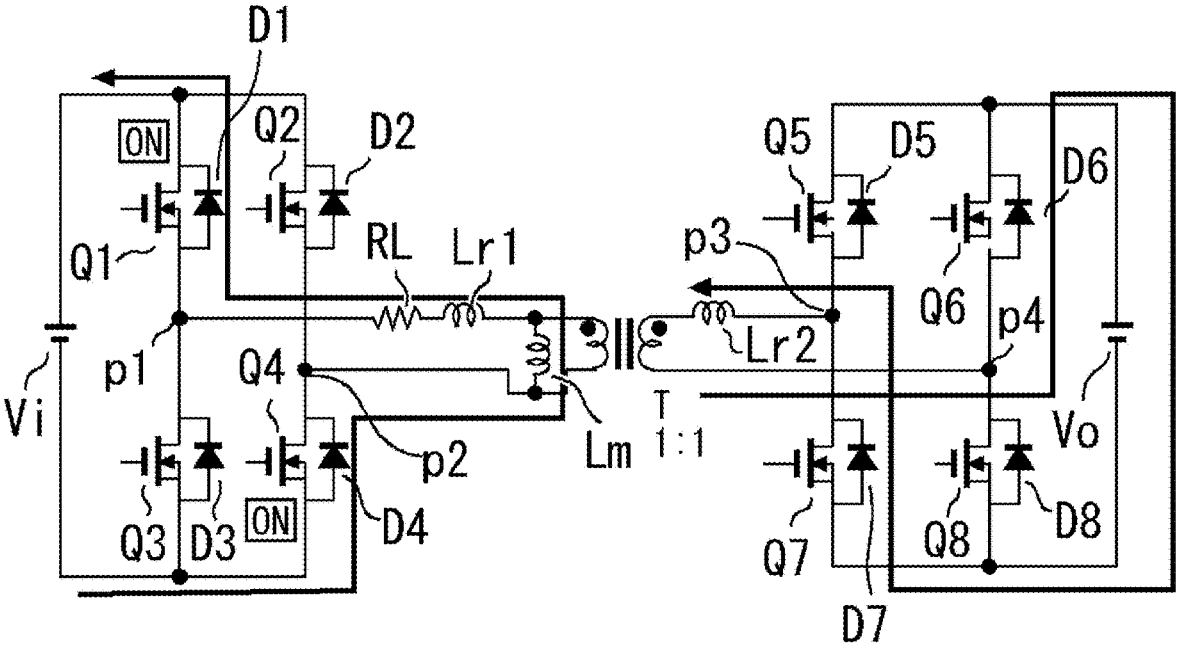

FIG. 12A and FIG. 12B are diagrams for describing the current paths in the step-up mode minimum TΦ and the step-down mode maximum TΦ. FIG. 12A represents a current path in the step-up mode minimum TΦ, and FIG. 12B represents a current path in the step-down mode maxi- mum TΦ. In FIG. 12A and FIG. 12B, the current paths are represented by solid line arrows. Note that the current path in the step-up mode minimum TΦ and the current path in the step-down mode maximum TΦ are current paths formed in a state of transition after the dead time illustrated in FIG. 11B.

In the step-up mode minimum TΦ, the switching elements Q1 and Q4 of the first full bridge circuit 11 are ON and the switching element Q8 of the second full bridge circuit 12 is ON, as illustrated in FIG. 12A. Also, as represented by the solid line arrow, in the first full bridge circuit 11, a current flows through the current path in the order of the input voltage Vi (negative electrode side), the switching element Q4, the connection point p2, the excitation inductance Lm, the first reactor Lr1, the impedance RL, the connection point p1, the switching element Q1, and the input voltage Vi (positive electrode side). Also, in the second full bridge circuit 12, a current flows through the current path in the order of the transformer TR (secondary side), the connection point p4, the switching element Q8, the diode D7, the connection point p3, the second reactor Lr2, and the trans- former TR (secondary side).

In the step-down mode maximum TΦ, the switching elements Q1 and Q4 of the first full bridge circuit 11 are controlled to be ON and the switching element Qn (n=5 to 8) of the second full bridge circuit 12 is controlled to be OFF, as illustrated in FIG. 12B. Thus, in the first full bridge circuit 11 in the step-down mode maximum TΦ, a current flows through a current path similar to that of the step-up mode minimum TΦ illustrated in FIG. 12A. However, in the second full bridge circuit 12, since the switching element Qn (n=5 to 8) is controlled to be OFF, a current flows through a current path in the order of the transformer TR (secondary side), the connection point p4, the diode D6, the output voltage Vo, the diode D7, the connection point p3, the second reactor Lr2, and the transformer TR (secondary side).

When the current paths illustrated in FIG. 12A and FIG. 12B are compared with each other, the current paths on the first full bridge circuit 11 side are similar, but the current paths on the second full bridge circuit 12 side differ in terms of the step-up mode minimum TΦ and the step-down mode maximum TΦ. Thus, when the operation mode is switched from the step-up mode minimum TΦ to the step-down mode maximum TΦ, an output difference occurs in the current flowing through the transformer TR.

Figure 13:
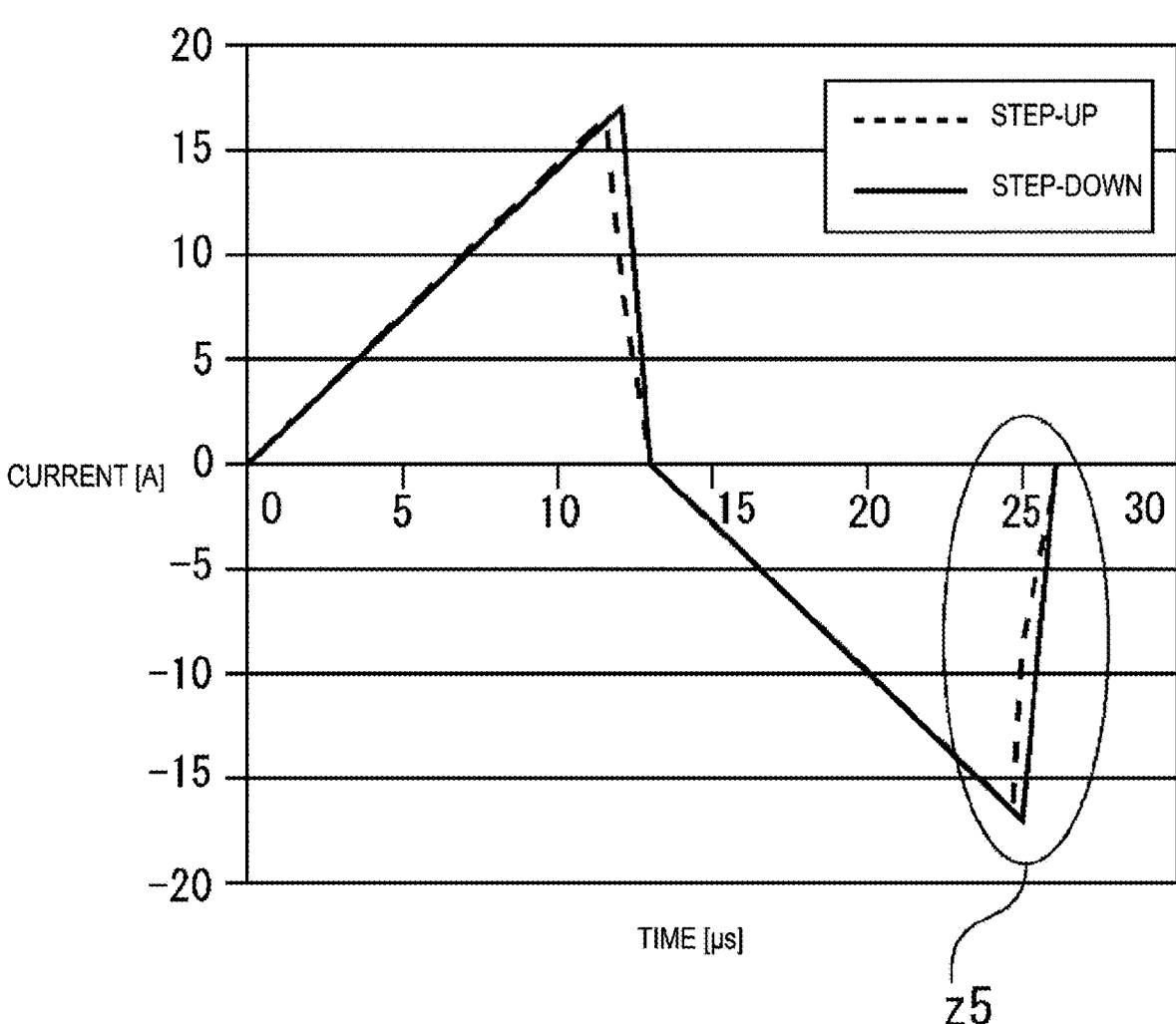
FIG. 13 is a graph showing the transition of the current in the step-up mode minimum TΦ and the step-down mode maximum TΦ of the power converter according to the embodiment of the present invention.

FIG. 13 is a graph showing the transition of the current in the step-up mode minimum TΦ and the step-down mode maximum TΦ. The vertical axis represents the magnitude of the current (A), and the horizontal axis represents the passage of time (μs). In FIG. 13, the broken line indicated in the graph represents the transition of the current flowing through the transformer TR in the step-up mode minimum TΦ, and the solid line indicated in the graph represents the transition of the current flowing through the transformer TR in the step-down mode maximum TΦ. As indicated by the region surrounded by a solid line ellipse z5, it can be seen that there is a difference in output of the current flowing through the transformer TR such that the step-down mode maximum TΦ is greater than the step-up mode minimum TΦ. The current negative peak value of the step-up mode minimum TΦ is smaller than that of the step-down mode maximum TΦ, and the increasing slope until the value of the current reaches zero after the peak value is also gentler than that of the step-down mode maximum TΦ.

When the current paths illustrated in FIG. 9A and FIG. 9B are compared with each other, the step-up mode minimum TΦ and the step-down mode maximum TΦ are different from each other in that the switching element Q7 of the third leg L3 is ON. Similarly, when the current paths illustrated in FIG. 12A and FIG. 12B are compared with each other, the step-up mode minimum TΦ and the step-down mode maxi- mum TΦ are different from each other in that the switching element Q8 of the fourth leg L4 is ON. The current paths of the step-up mode minimum TΦ and the step-down mode maximum TΦ illustrated in FIG. 9A and FIG. 9B are based on the switching after the dead time illustrated in FIG. 8B, and the current paths of the step-up mode minimum TΦ and the step-down mode maximum TΦ illustrated in FIG. 12A and FIG. 12B are based on the switching after the dead time illustrated in FIG. 11B.

Thus, for example, by relatively extending (increasing) the dead time period of the third leg L3 illustrated in FIG. 8B, it is possible to form the same current path as the step-down mode maximum TΦ before the switching ele- ment Q7 in the step-up mode minimum TΦ is turned ON. That is, by switching from the step-up mode minimum TΦ to the step-down mode maximum TΦ within the extended dead time period of the third leg L3, it is possible to suppress output fluctuation due to a difference in the current paths at the time of switching between step-up and step-down. The same applies to FIG. 12A and FIG. 12B. For example, by relatively extending (increasing) the dead time period of the fourth leg L4 illustrated in FIG. 11B, it is possible to form the same current path as the step-down mode maximum TΦ before the switching element Q8 in the step-up mode minimum TΦ is turned ON. In this case also, by switching from the step-up mode minimum TΦ to the step-down mode maximum TΦ within the extended dead time period of the fourth leg L4, it is possible to suppress output fluctuation due to a difference in the current paths at the time of switching between step-up and step-down. With the power converter 1 according to the present embodiment, to ensure the same current path in both the step-up switching minimum TΦ and the step-down switching maximum TΦ, the dead time of some of the legs related to the switching is extended (increased). However, since an increase in the dead time period may cause an increase in the step-up/step-down conversion loss, the dead times of the other legs are changed to the minimum period.

Figure 14:
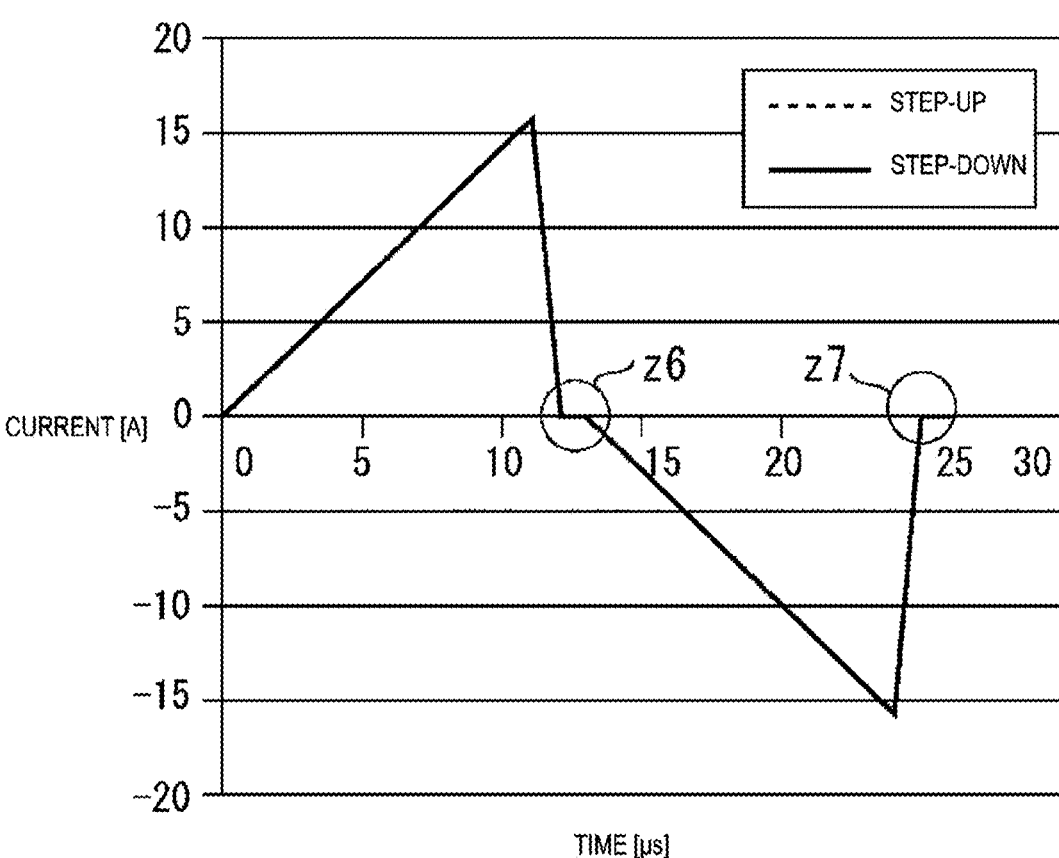
FIG. 14 is a graph showing the transition of the current in the step-up mode and the step-down mode of the power converter according to the embodiment of the present invention.

FIG. 14 is a graph showing the transition in current in the step-up mode and the step-down mode according to the present embodiment. The vertical axis represents the magnitude of the current (A), and the horizontal axis represents the passage of time (μs). In FIG. 14, the broken line indicated in the graph represents the transition of the current flowing through the transformer TR in the step-up mode, and the solid line indicted in the graph represents the transition of the current in the step-down mode. As illustrated in FIG. 14, it can be seen that the transition of the current in the step-up mode and the transition of the current in the step-down mode have the same inclination. Thus, no output fluctuation occurs even when switching from the step-up mode minimum TΦ to the step-down mode maximum TΦ. In addition, as indicated by the solid line circle regions z6 and z7, in the regions at which the current flowing through the transformer TR shifts from the positive side to the negative side and from the negative side to the positive side, certain periods (current discontinuation periods) in which the current value transitions at zero are ensured. Since the dead time for some of the legs related to switching is extended (increased), the direct current component of the excitation current flowing through the transformer TR can be suppressed.

Figure 15:
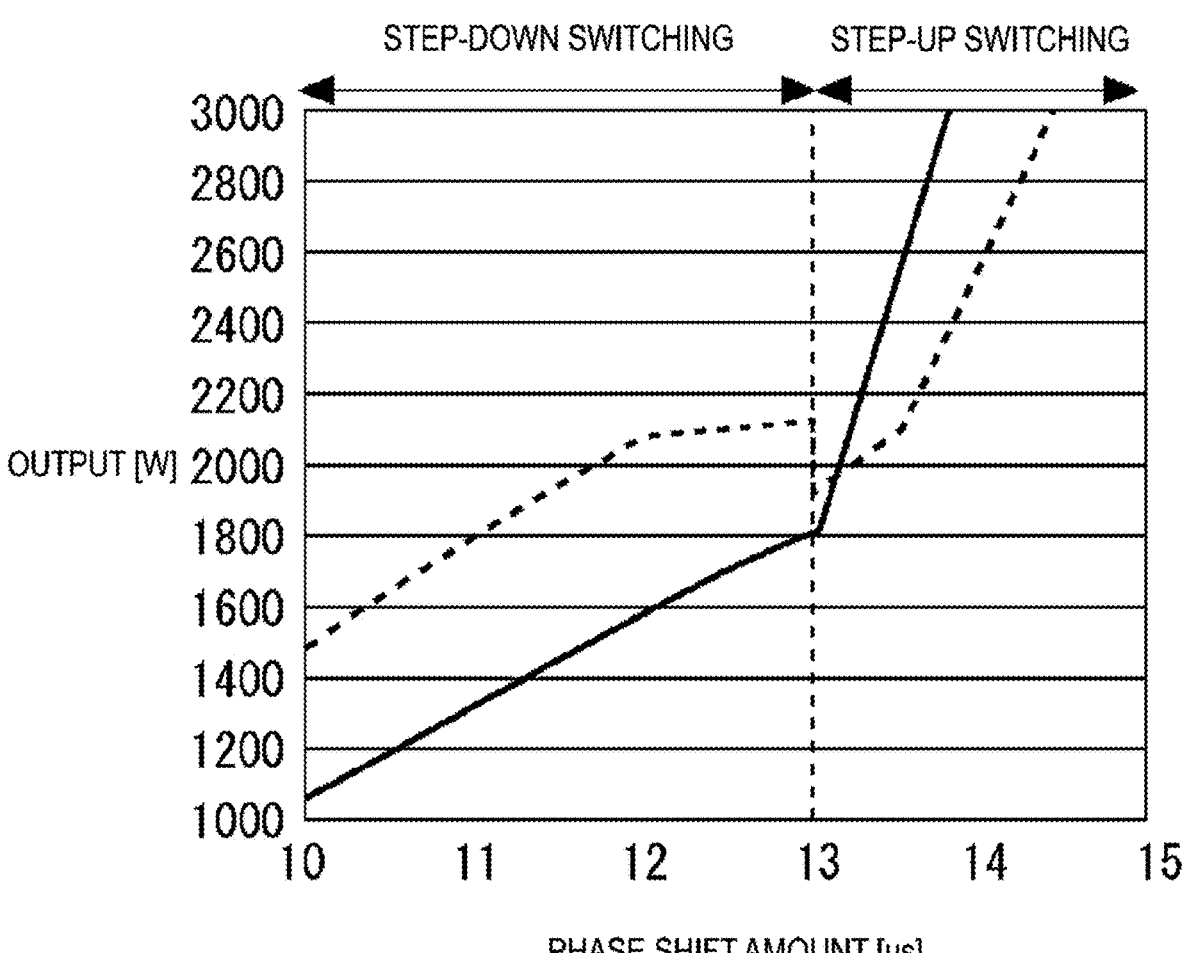
FIG. 15 is a graph for describing the transition of a phase shift amount at the time of step-up/step-down switching of the power converter according to the embodiment of the present invention.

FIG. 15 is a graph for describing the transition of the phase shift amount at the time of switching between step-up and step-down according to the present embodiment. In FIG. 15, the vertical axis represents the magnitude of the output power (W), and the horizontal axis represents the phase shift amount (us). The broken line indicated in the graph represents the transition of the output depending on the phase shift amount in the power converter 1 based on that described in reference to FIG. 8A, FIG. 8B, FIG. 9A, FIG. 9B, FIG. 10, FIG. 11A, FIG. 11B, FIG. 12A, FIG. 12B and FIG. 13, and the solid line indicated in the graph represents the transition of the output depending on the phase shift amount in the power converter 1 according to the present embodiment.

As illustrated in FIG. 15, when the phase shift amount is 13 μs, the DC/DC converter 10 switches from the step-up mode to the step-down mode. This phase shift amount corresponds to the step-up mode minimum TΦ and corresponds to the step-down mode maximum TΦ. In the premised power converter 1, as represented by the solid line, a difference in output of about 200 W occurs at the time of switching from the step-up mode minimum TΦ to the step-down mode maximum TΦ, whereas in the power converter 1 according to the present embodiment, as represented by the broken line, switching from the step-up mode minimum TΦ to the step-down mode maximum TΦ is performed without a difference in output occurring. According to the present embodiment, it is possible to more efficiently switch the step-up/step-down operation mode at a high speed while suppressing output fluctuation of the power converter 1.

<Processing Flow>

Next, control of switching in the power converter 1 according to the present embodiment will be described with reference to FIG. 16A, FIG. 16B, FIG. 16C, FIG. 16D, FIG. 16E and FIG. 17A, FIG. 17B, FIG. 17C, FIG. 17D, FIG. 17E. The control unit 20 of the power converter 1 according to the present embodiment generates the control signals Gn (n=1 to 8) on the basis of the voltage values measured by the voltage sensor 15p provided at the first input/output terminal pair 13 and the voltage sensor 15s provided at the second input/output terminal pair 14 of the DC/DC converter 10, for example, and outputs the control signals Gn to the gate terminals of the corresponding switching elements Qn (n=1 to 8). However, the control unit 20 of the power converter 1 may generate the control signals Gn (n=1 to 8) using measurement values (current values) of various sensors provided in the DC/DC converter 10 for measuring the magnitude of the input/output current. (Step-up Switching)

Figure 16A:
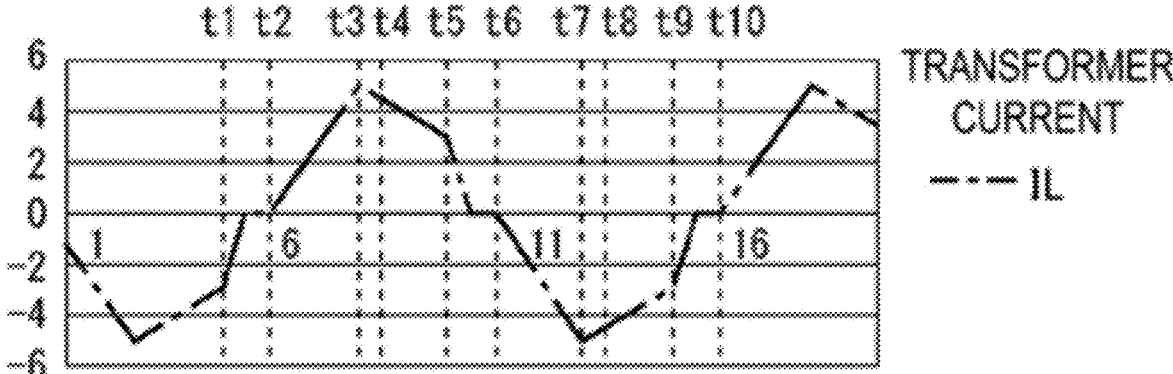
FIG. 16A, FIG. 16B, FIG. 16C, FIG. 16D and FIG. 16E are timing charts illustrating the transition of a control state in step-up switching of the power converter according to the embodiment of the present invention.

FIG. 16A, FIG. 16B, FIG. 16C, FIG. 16D and FIG. 16E are timing charts illustrating the transition of a control state in step-up switching. In the graph shown in FIG. 16A, the transition of a transformer current IL flowing through the transformer TR (a current flowing through the first reactor Lr1) is represented by a dot-dash line. In FIG. 16A, the vertical axis represents the relative magnitude of the transformer current IL, and the horizontal axis represents the passage of time. As represented by the dot-dash line graph in FIG. 16A, in the DC/DC converter 10 according to the present embodiment, a current discontinuation period in which the current flowing through the transformer TR transitions at zero is provided in the t1 to t2 section, the t5 to t6 section, and the t9 to t10 section.

Figure 16B:
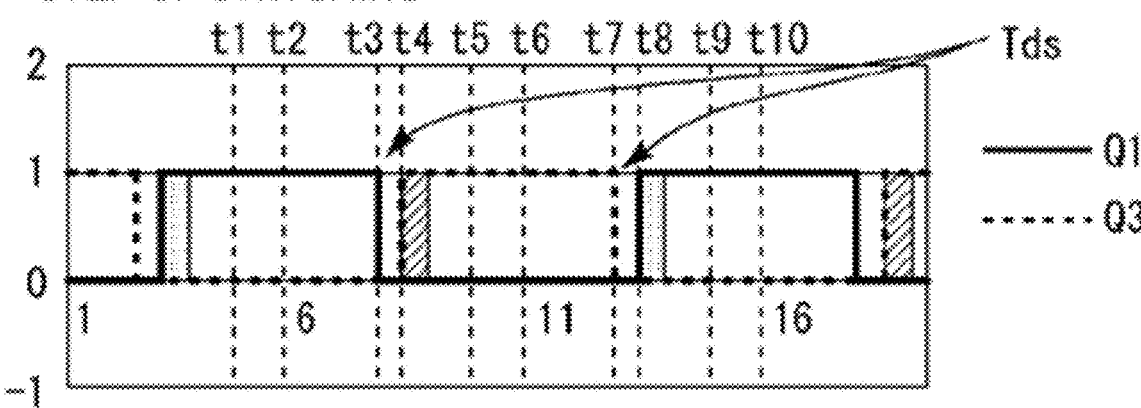
Figure 16C:
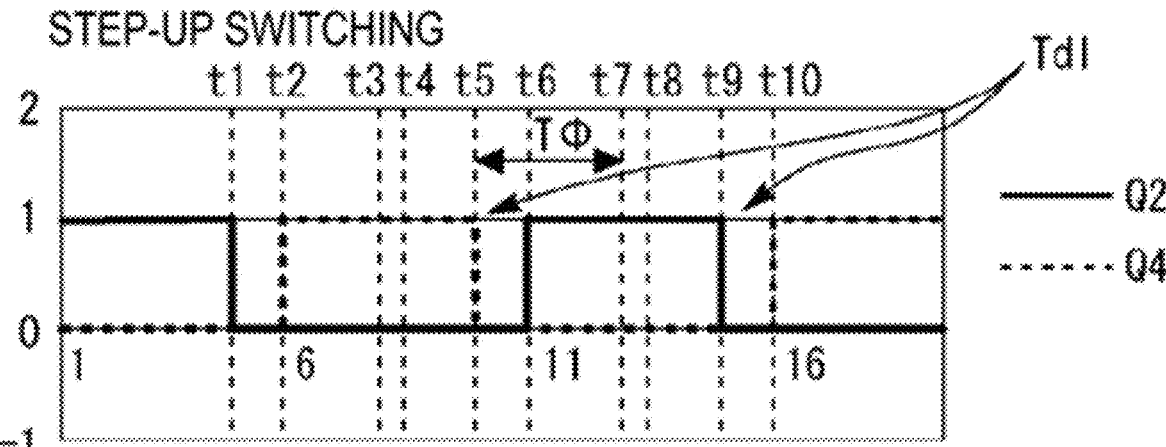
Figure 16D:
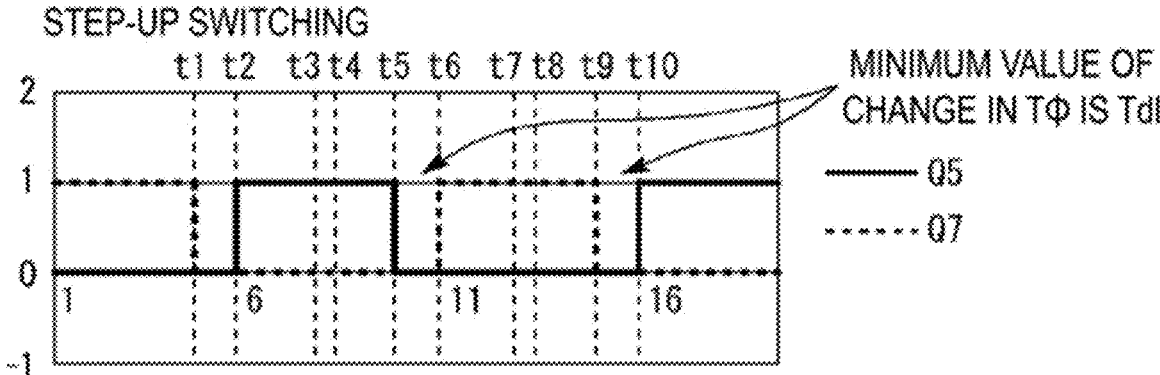
Figure 16E:
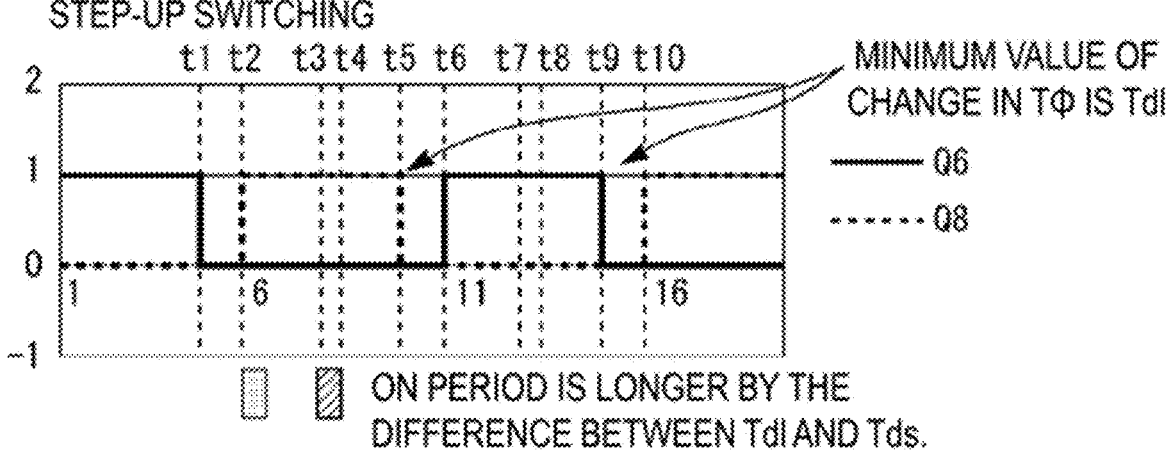

In addition, in FIG. 16B, FIG. 16C, FIG. 16D and FIG. 16E, the transitions of the ON period and the OFF period of each of the switching elements constituting the first leg L1 to the fourth leg L4 are represented in order. To be more specific, in FIG. 16B, the transitions of the ON period and the OFF period of the switching element Q1 are represented by a solid line, and the transitions of the ON period and the OFF period of the switching element Q3 are represented by a broken line. In FIG. 16C, the transitions of the ON period and the OFF period of the switching element Q2 are represented by a solid line, and the transitions of the ON period and the OFF period of the switching element Q4 are represented by a broken line. Similarly, in FIG. 16D, the transitions of the ON period and the OFF period of the switching element Q5 are represented by a solid line, and the transitions of the ON period and the OFF period of the switching element Q7 are represented by a broken line. In FIG. 16E, the transitions of the ON period and the OFF period of the switching element Q6 are represented by a solid line, and the transitions of the ON period and the OFF period of the switching element Q8 are represented by a broken line. In FIG. 16B, FIG. 16C, FIG. 16D and FIG. 16E, the vertical axis represents the ON/OFF state of each of the switching elements, and the horizontal axis represents the passage of time. It should be noted that "1" on the vertical axes of FIG. 16B, FIG. 16C, FIG. 16D and FIG. 16E represents ON for each of the switching elements (current flowing between the drain terminal and the source terminal), and "0" represents OFF for each of the switching elements (the circuit being open between the drain terminal and the source terminal).

In the power converter 1 according to the present embodiment, the duration of the period of the dead time (simultaneously OFF) for each of the switching elements constituting the first leg L1 to the fourth leg L4 is adjusted as described below during the step-up switching.

The duration of the period in which the switching elements Q2 and Q4 of the second leg L2 are simultaneously OFF is relatively increased.

The duration of the simultaneous OFF period of another leg (e.g., the first leg L1) is set to be relatively small.

The duration of the simultaneous OFF period of the third leg L3 and the fourth leg L4 are not fixed durations but variable in duration.

The switching element Q5 of the third leg L3 and the switching element Q6 of the fourth leg L4 may be constantly OFF (without synchronous rectifying).

As described above, in the power converter 1 including the DC/DC converter 10, a period during which the switching elements constituting the first leg L1 to the fourth leg L4 are simultaneously turned OFF is uniformly set as the dead time to prevent arm short-circuiting of the switching elements. The dead time period is set to have a certain degree of variable width in consideration of the specifications and required performance of the power converter 1, the switching delay of each switching element constituting the DC/DC converter 10, the characteristics of the various devices, and the like. In the variable width, the minimum value is defined as a dead time minimum period (Tds) and the maximum value is defined as a dead time maximum period (Tdl). In general, as the dead time (simultaneous OFF period) increases, the loss of power conversion at the time of step-up/step-down increases. Thus, it is desirable that the dead time is set to be small.

With the power converter 1 according to the present embodiment, the dead time is controlled to be increased only in the period effective for current discontinuation (the current value zero section) of the transformer current IL flowing through the transformer TR, and the magnetic bias that occurs in the transformer TR is suppressed while suppressing a relative reduction in loss.

The current discontinuation sections of the t5-to-t6 section and the t9-to-t10 section in FIG. 16A are taken as examples. As illustrated in FIG. 16C, with the power converter 1 according to the present embodiment, the duration of the period (dead time) in which the switching elements Q2 and Q4 of the second leg L2 are simultaneously OFF is set to the dead time maximum period (Tdl). Also, as illustrated in FIG. 16B, the duration of the period (dead time) in which the switching elements Q1 and Q3 of the first leg L1 are simultaneously OFF is set to the dead time minimum period (Tds). As a result, as shown in FIGS. 16B and 16C, the dead time of the second leg L2 becomes relatively large (long) with respect to the dead time of the first leg L1 because the duration of the difference "dead time maximum period (Tdl)—dead time minimum period (Tds)" is extended.

For example, in the t9-to-t10 section, when the ON period of the switching element Q1 represented by the solid line in FIG. 16B is compared with the ON period of the switching element Q4 represented by the broken line in FIG. 16C, it can be seen that the period of the region hatched with dots is added to the rise of the ON period of the switching element Q1 and that the duration of the ON period of the switching element Q1 is relatively long. Similarly, in the t5-to-t6 section, when the ON period of the switching element Q3 represented by the broken line in FIG. 16B is compared with the ON period of the switching element Q2 represented by the solid line in FIG. 16C, it can be seen that the period of the region hatched with diagonal lines is added to the rise of the ON period of the switching element Q3 and that the duration of the ON period of the switching element Q3 is relatively long.

In addition, in the third leg L3, for example, as illustrated in the t3-to-t6 section in FIG. 16D, the rise of the ON period of the switching element Q5 is set to the dead time minimum period (Tds) with respect to the fall of the ON period of the switching element Q7. The rise of the ON period of the switching element Q7 is varied according to the phase shift amount (TΦ) so as to be equal to or longer than at least the dead time maximum period (Tdl) with respect to the fall of the ON period of the switching element Q5. The phase shift amount (TΦ) is represented, for example, as a difference amount between the fall of the ON period of the switching element Q2 constituting the second leg L2 and the fall of the ON period of the switching element Q7. As illustrated by the rise of the ON period of the switching element Q5 at t4 in FIG. 16D, it can be seen that the period of the region hatched with dots is added and that the ON period of the switching element is extended.

In addition, also in the fourth leg L4, for example, as illustrated in the t7-to-t10 section in FIG. 16E, the rise of the ON period of the switching element Q6 is set to the dead time minimum period (Tds) with respect to the fall of the ON period of the switching element Q8. The rise of the ON period of the switching element Q8 is varied according to the phase shift amount (TΦ) so as to be equal to or longer than at least the dead time maximum period (Tdl) relative to the fall of the ON period of the switching element Q6. The phase shift amount (TΦ) is represented, for example, as a difference amount between the fall of the ON period of the switching element Q4 constituting the second leg L2 and the fall of the ON period of the switching element Q8. As illustrated by the rise of the ON period of the switching element Q6 at 18 in FIG. 16E, it can be seen that the period of the region hatched with dots is added and that the ON period of the switching element is extended.

(Step-Down Switching)

Figure 17A:
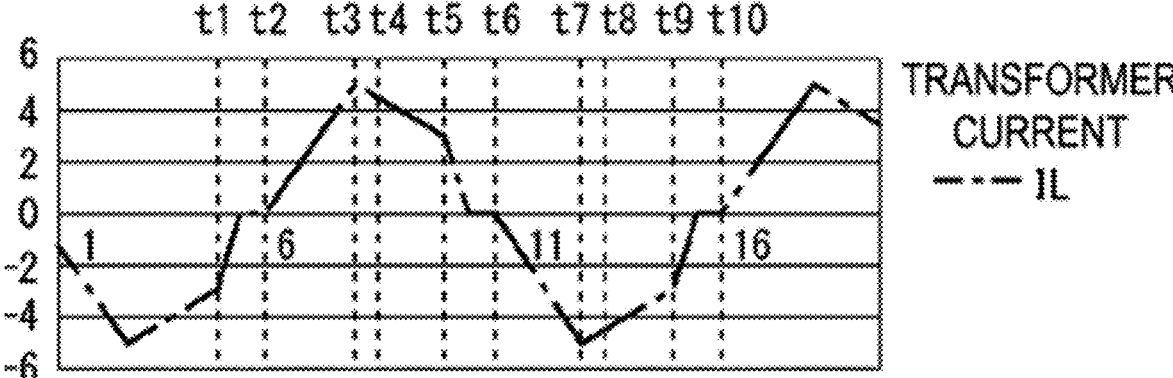
FIG. 17A, FIG. 17B, FIG. 17C, FIG. 17D and FIG. 17E are timing charts illustrating the transition of a control state in step-down switching of the power converter according to the embodiment of the present invention.

FIG. 17A, FIG. 17B, FIG. 17C, FIG. 17D and FIG. 17E are timing charts showing the transition of a control state in step-down switching. In FIG. 17A, a graph showing the transition of a transformer current IL flowing through the transformer TR (a current flowing through the first reactor Lr1) is represented by the dot-dash line. In FIG. 17A, the vertical axis represents the relative magnitude of the transformer current IL, and the horizontal axis represents the passage of time. As represented by the dot-dash line graph in FIG. 17A, in the DC/DC converter 10 according to the present embodiment, a current discontinuation period in which the current flowing through the transformer TR transitions at zero is provided in the t1-to-t2 section, the t5-to-t6 section, and the t9-to-t10 section.

Figure 17B:
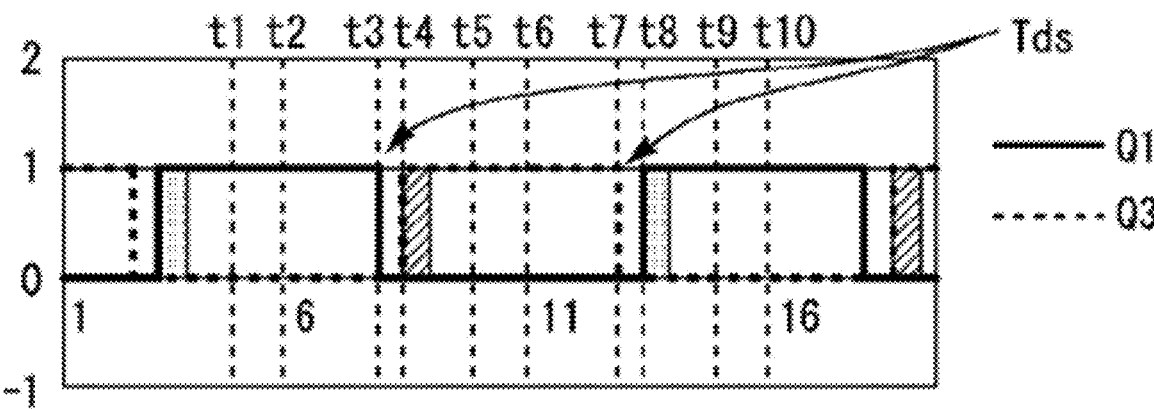
Figure 17C:
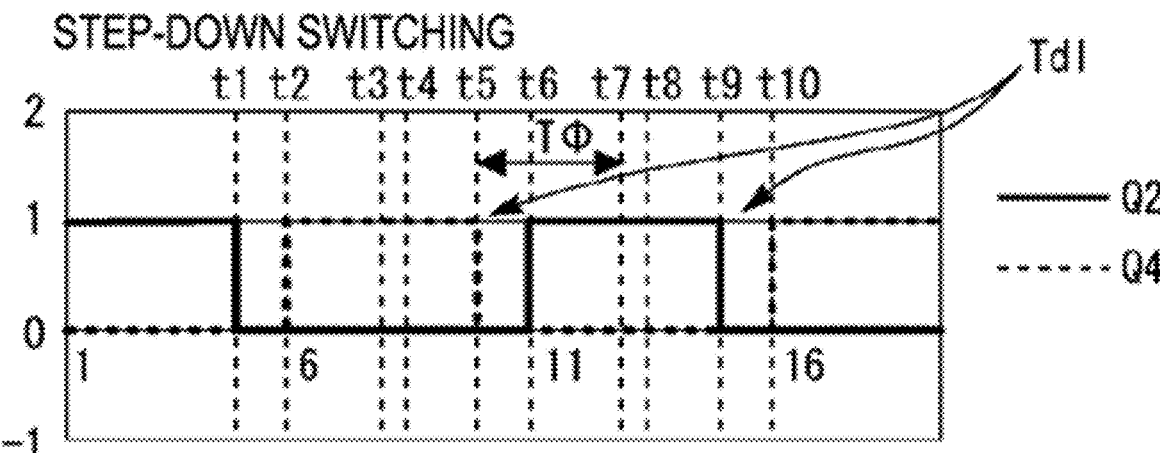
Figure 17D:
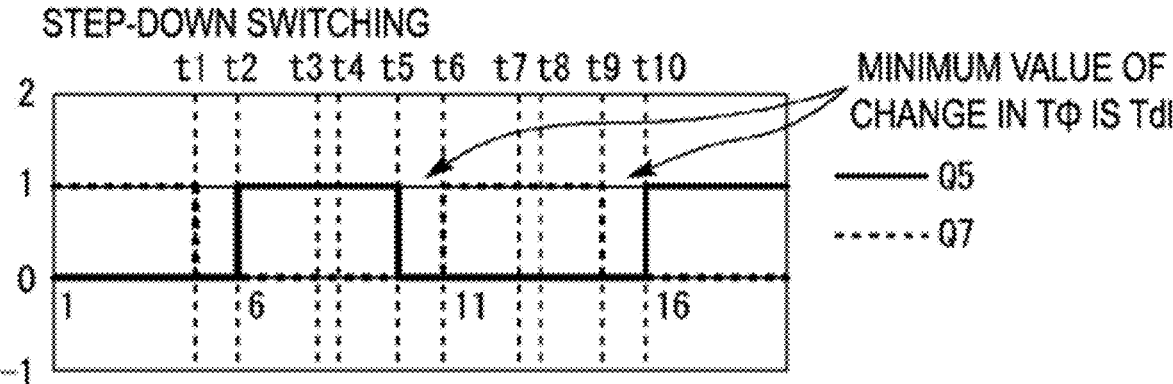
Figure 17E:
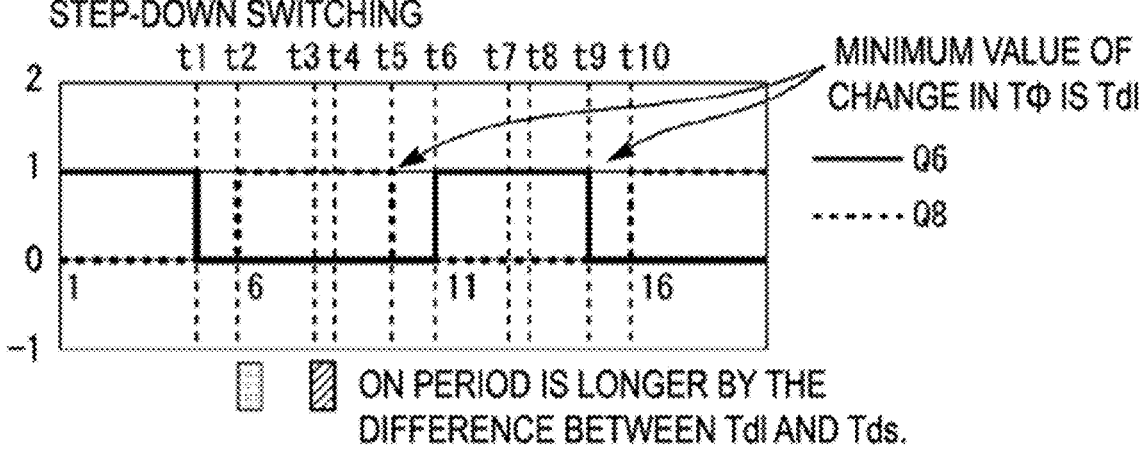

In addition, in FIG. 17B, FIG. 17C, FIG. 17D and FIG. 17E, the transitions of the ON period and the OFF period of each of the switching elements constituting the first leg L1 to the fourth leg L4 are represented in order. To be more specific, in FIG. 17B, the transitions of the ON period and the OFF period of the switching element Q1 are represented by a solid line, and the transitions of the ON period and the OFF period of the switching element Q3 are represented by a broken line. In FIG. 17C, the transitions of the ON period and the OFF period of the switching element Q2 are represented by a solid line, and the transitions of the ON period and the OFF period of the switching element Q4 are represented by a broken line. Similarly, in FIG. 17D, the transitions of the ON period and the OFF period of the switching element Q5 are represented by a solid line, and the transitions of the ON period and the OFF period of the switching element Q7 are represented by a broken line. In FIG. 17E, the transitions of the ON period and the OFF period of the switching element Q6 are represented by a solid line, and the transitions of the ON period and the OFF period of the switching element Q8 are represented by a broken line. In FIG. 17B, FIG. 17C, FIG. 17D and FIG. 17E, the vertical axis represents the ON/OFF state of each of the switching elements, and the horizontal axis represents the passage of time. "1" on the vertical axes of FIG. 17B, FIG. 17C, FIG. 17D and FIG. 17E represents ON for each of the switching elements (current flowing between the drain terminal and the source terminal), and "0" represents OFF for each of the switching elements (the circuit being open between the drain terminal and the source terminal).

In the power converter 1 according to the present embodiment, the duration of the period of the dead time (simultaneously OFF) for each of the switching elements constituting the first leg L1 to the fourth leg L4 is adjusted as described below during the step-down switching.

The duration of the period in which the switching elements Q1 and Q3 of the first leg L1 are simultaneously OFF is relatively decreased.

The duration of the simultaneous OFF period of another leg (e.g., the second leg L2) is set to be relatively large.

The duration of the simultaneous OFF period of the third leg L3 and the fourth leg L4 are not fixed durations but variable in duration.

The switching elements Q5 and Q7 of the third leg L3 and the switching elements Q6 and Q8 of the fourth leg L4 may be constantly OFF (without synchronous rectifying).

With the power converter 1 according to the present embodiment, in the step-down switching, as in the step-up switching, the dead time is controlled to be increased only in the period effective for current discontinuation (the current value zero section) of the transformer current IL flowing through the transformer TR, and the magnetic bias that occurs in the transformer TR is suppressed while suppressing a relative reduction in loss.

As illustrated in FIG. 17B, with the power converter 1 according to the present embodiment, in the step-down switching, the duration of the period (dead time) in which the switching elements Q1 and Q3 of the first leg L1 are simultaneously OFF is set to the dead time minimum period (Tds). Also, as illustrated in FIG. 17C, the duration of the period (dead time) in which the switching elements Q2 and Q4 of the second leg L2 are simultaneously OFF is set to the dead time maximum period (Tdl). As a result, with the dead time of the second leg L2 in the t5-to-t6 section and the t9-to-t10 section, the duration of the difference "dead time maximum period (Tdl)-dead time minimum period (Tds)" relative to the dead time set for the first leg L1 becomes relatively large (long).

In the t3-to-t5 section in FIG. 17B, it can be seen that the period of the region hatched with diagonal lines is added to the rise of the ON period of the switching element Q3 represented by the broken line, and the dead time between the fall of the ON period of the switching element Q1 represented by the solid line is shortened. Similarly, in the t7-to-t9 section, it can be seen that the period of the region hatched with dots is added to the rise of the ON period of the switching element Q1 represented by the solid line, and the dead time between the fall of the ON period of the switching element Q3 represented by the broken line is shortened. The phase shift amount (TΦ) in the step-down switching is represented as a difference amount between the fall of the ON period of the switching element Q4 of the second leg L2 and the fall of the ON period of the switching element Q3 of the first leg L1.

In the third leg L3, for example, as illustrated in the t5-to-t6 section in FIG. 17D, the fall of the ON period of the switching element Q5 is varied according to the phase shift amount (TΦ) so as to be at least the dead time maximum period (Tdl) with respect to the rise of the ON period of the switching element Q7. Also, in the t9-to-t10 section, the rise of the ON period of the switching element Q5 is varied according to the phase shift amount (TΦ) so as to be at least the dead time maximum period (Tdl) with respect to the fall of the ON period of the switching element Q7.

Also, in the fourth leg L4, for example, as illustrated in the t5-to-t6 section in FIG. 17E, the rise of the ON period of the switching element Q6 is varied according to the phase shift amount (TΦ) so as to be at least the dead time maximum period (Tdl) with respect to the fall of the ON period of the switching element Q8. Also, as in the t9-to-t10 section, the rise of the ON period of the switching element Q8 is varied according to the phase shift amount (TΦ) so as to be at least the dead time maximum period (Tdl) with respect to the fall of the ON period of the switching element Q6.

Modified Example

In the embodiment, step-up switching and step-down switching in which the first full bridge circuit 11 connected to the first input/output terminal pair 13 of the power converter 1 is on the primary side have been described. The same applies to step-up switching and step-down switching in which the second full bridge circuit 12 connected to the second input/output terminal pair 14 of the power converter 1 is on the primary side. Which of the first full bridge circuit 11 and the second full bridge circuit 12 is set as the secondary side may be determined by the control unit 20 of the power converter 1 determining the power running/regeneration operation state.

(Others)

The above-described embodiments are merely examples, and the disclosure of the present embodiments can be implemented through appropriate variation without departing from the spirits of the disclosure. The processing operations and means described in the present disclosure can be implemented in free combination as long as no technical contradiction arises. For example, in the embodiment, the DC/DC converter 10 of the power converter 1 has been described as an insulated bidirectional DC/DC converter, but the processing and means described in the present disclosure can also be applied to an insulated bidirectional buck-boost converter and a bidirectional multifunctional chopper.

The processing described as being performed by one circuit or device may be shared and performed by a plurality of circuits or devices. Alternatively, the processing described as being performed by different circuits or devices may be performed by one circuit or device.

Note that, to allow the constituent features of the present disclosure to be compared with the configurations of the examples, the constituent features of the present disclosure will be described below with reference numerals in the drawings.

<Supplement 1>

A power converter (1) includes:

a DC/DC converter (10) including a first full bridge circuit (11) including a first switching leg (L1) and a second switching leg (L2) connected in parallel with a first input/output terminal pair (13), a second full bridge circuit (12) including a third switching leg (L3) and a fourth switching leg (L4) connected in parallel with a second input/output terminal pair (14), and a transformer (TR) including a first winding (Wn1) connected to the first full bridge circuit (11) and a second winding (Wn2) connected to the second full bridge circuit (12); and a control unit (20) configured to control the DC/DC converter (10), wherein the first switching leg (L1) includes a first switching element (Q1) and a third switching element (Q3), a source terminal of the first switching element (Q1) and a drain terminal of the third switching element (Q3) being connected in series at a first connection point (p1), and a drain terminal of the first switching element (Q1) and a source terminal of the third switching element (Q3) being connected to the first input/output terminal pair (13), the second switching leg (L2) includes a second switching element (Q2) and a fourth switching element (Q4), a source terminal of the second switching element (Q2) and a drain terminal of the fourth switching element (Q4) being connected in series at a second connection point (p2), and a drain terminal of the second switching element (Q2) and a source terminal of the fourth switching element (Q4) being connected to the first input/output terminal pair (13), the third switching leg (L3) includes a fifth switching element (Q5) and a seventh switching element (Q7), a source terminal of the fifth switching element (Q5) and a drain terminal of the seventh switching element (Q7) being connected in series at a third connection point (p3), and a drain terminal of the fifth switching element (Q5) and a source terminal of the seventh switching element (Q7) being connected to the second input/output terminal pair (14), the fourth switching leg (L4) includes a sixth switching element (Q6) and an eighth switching element (Q8), a source terminal of the sixth switching element (Q6) and a drain terminal of the eighth switching element (Q8) being connected in series at a fourth connection point (p4), and a drain terminal of the sixth switching element (Q6) and a source terminal of the eighth switching element (Q8) being connected to the second input/output terminal pair (14), the first winding (Wn1) of the transformer (TR) is connected to the first connection point (p1) of the first switching leg (L1) and the second connection point (p2) of the second switching leg (L2), and the second winding (Wn2) of the transformer (TR) is connected to the third connection point (p3) of the third switching leg (L3) and the fourth connection point (p4) of the fourth switching leg (L4), and when a step-up operation is performed, the control unit (20) outputs a first reference control signal for turning ON/OFF the first switching element (Q1) to the first switching element (Q1) and the third switching element (Q3) of the first full bridge circuit (11), outputs a first reference inverted signal with an inverted phase with respect to the first reference control signal to the second switching element (Q2) and the fourth switching element (Q2), and extends a period in which at least the second switching element (Q2) and the fourth switching element (Q4) of the second switching leg (L2) are simultaneously OFF such that the period is longer than the period in which the first switching element (Q1) and the third switching element (Q3) of the first switching leg (L1) are simultaneously OFF.

REFERENCE SIGNS LIST

1 Power Converter
10 DC/DC converter
11 First full bridge circuit
12 Second full bridge circuit
13 First input/output terminal pair
14 Second input/output terminal pair
20 Control unit
L1 First switching leg
L2 Second switching leg
L3 Third switching leg
L4 Fourth switching leg
Lr1 First reactor
Lr2 Second reactor
Lm Excitation inductance
p1 First connection point
p2 Second connection point
p3 Third connection point
p4 Fourth connection point
Q1 First switching element
Q2 Second switching element
Q3 Third switching element
Q4 Fourth switching element
Q5 Fifth switching element
Q6 Sixth switching element
Q7 Seventh switching element
Q8 Eighth switching element
TR Transformer
Wn1 First winding
Wn2 Second winding

The invention claimed is:

1. A power converter, comprising:

a DC/DC converter including a first full bridge circuit including a first switching leg and a second switching leg connected in parallel with a first input/output terminal pair, a second full bridge circuit including a third switching leg and a fourth switching leg connected in parallel with a second input/output terminal pair, and a transformer including a first winding connected to the first full bridge circuit and a second winding connected to the second full bridge circuit; and a control unit configured to control the DC/DC converter, wherein the first switching leg includes a first switching element and a third switching element, a source terminal of the first switching element and a drain terminal of the third switching element being connected in series at a first connection point, and a drain terminal of the first switching element and a source terminal of the third switching element being connected to the first input/output terminal pair, the second switching leg includes a second switching element and a fourth switching element, a source terminal of the second switching element and a drain terminal of the fourth switching element being connected in series at a second connection point, and a drain terminal of the second switching element and a source terminal of the fourth switching element being connected to the first input/output terminal pair, the third switching leg includes a fifth switching element and a seventh switching element, a source terminal of the fifth switching element and a drain terminal of the seventh switching element being connected in series at a third connection point, and a drain terminal of the fifth switching element and a source terminal of the seventh switching element being connected to the second input/output terminal pair, the fourth switching leg includes a sixth switching element and an eighth switching element, a source terminal of the sixth switching element and a drain terminal of the eighth switching element being connected in series at a fourth connection point, and a drain terminal of the sixth switching element and a source terminal of the eighth switching element being connected to the second input/output terminal pair, the first winding of the transformer is connected to the first connection point of the first switching leg and the second connection point of the second switching leg, and the second winding of the transformer is connected to the third connection point of the third switching leg and the fourth connection point of the fourth switching leg, and when a step-up operation is performed, the control unit outputs a first reference control signal for turning ON/OFF the first switching element and the third switching element of the first full bridge circuit, outputs a first reference inverted signal with an inverted phase with respect to the first reference control signal to the second switching element and the fourth switching element, and extends a period in which at least the second switching element and the fourth switching element of the second switching leg are simultaneously OFF such that the period is longer than a period in which the first switching element and the third switching element of the first switching leg are simultaneously OFF, wherein the control unit varies a period in which the fifth switching element and the seventh switching element of the third switching leg are simultaneously OFF according to a first phase shift amount, where the first phase shift amount is a delay amount from a fall of the second switching element from ON to OFF to a fall of the seventh switching element of the third switching leg from ON to OFF.

2. The power converter according to claim 1, wherein the control unit varies a period in which the sixth switching element and the eighth switching element of the fourth switching leg are simultaneously OFF according to a second phase shift amount, where the second phase shift amount is a delay amount from a fall of the fourth switching element from ON to OFF to a fall of the eighth switching element of the fourth switching leg from ON to OFF.

3. The power converter according to claim 1, wherein when a step-down operation is performed, the control unit outputs a second reference control signal to the fourth switching element of the first full bridge circuit and outputs a second reference inverted signal with an inverted phase with respect to the second reference control signal to the second switching element, outputs a third reference control signal with a third phase shift amount delayed more than the second reference control signal to the third switching element of the first full bridge circuit and outputs a third reference inverted signal with an inverted phase with respect to the third reference control signal to the first switching element, and changes a period in which at least the first switching element and the third switching element of the first switching leg are simultaneously OFF such that the period is shorter than a period in which the second switching element and the fourth switching element of the second switching leg are simultaneously OFF, where the second reference control signal is a control signal for turning ON/OFF the fourth switching element of the first full bridge circuit, and the third phase shift amount is a delay amount from a fall of the fourth switching element from ON to OFF to a fall of the third switching element of the first switching leg from ON to OFF.

4. The power converter according to claim 3, wherein the control unit varies a period in which the fifth switching element and the seventh switching element of the third switching leg are simultaneously OFF according to the third phase shift amount.

5. The power converter according to claim 3, wherein the control unit varies a period in which the sixth switching element and the eighth switching element of the fourth switching leg are simultaneously OFF according to the third phase shift amount.

* * * * *